United States Patent [19]

Pooshs

[11] Patent Number: 5,372,093
[45] Date of Patent: Dec. 13, 1994

[54] MODULAR ANIMAL FEEDING APPARATUS

[76] Inventor: Marijan Pooshs, 2585 Carisbrook Dr., Oakland, Calif. 94611

[21] Appl. No.: 154,811

[22] Filed: Nov. 18, 1993

[51] Int. Cl.$^5$ ............................................. A01K 39/00
[52] U.S. Cl. ................................................. 119/51.11
[58] Field of Search ............... 119/51.11, 51.12, 51.13, 119/51.14, 51.5, 52.1, 53, 56.1

[56] References Cited

U.S. PATENT DOCUMENTS

| | | | |
|---|---|---|---|
| 3,847,121 | 11/1974 | Ruth | 119/51.13 |
| 3,955,537 | 5/1976 | Yujiri | 119/51.13 |
| 4,044,722 | 8/1977 | Bradshaw | 119/51.13 |
| 4,069,793 | 1/1978 | Gower | 119/51.13 |
| 4,256,054 | 3/1981 | Hitchcock | 119/51.11 |
| 4,315,483 | 2/1982 | Scheidler | 119/51.11 |
| 4,350,118 | 9/1982 | Ostler | 119/51 R |
| 4,350,119 | 9/1982 | Ostler | 119/51 R |
| 4,350,120 | 9/1982 | Bittle | 119/51.13 |
| 4,485,765 | 12/1984 | Schwartz et al. | 119/51.13 |
| 4,733,634 | 3/1988 | Hooser | 119/51.12 |
| 4,735,171 | 4/1988 | Essex | 119/51.12 |
| 4,895,109 | 1/1990 | De Groot et al. | 119/51.5 |
| 4,932,361 | 6/1990 | Deutsch et al. | 119/51.12 |
| 5,109,799 | 5/1992 | Lader | 119/51.13 |
| 5,129,361 | 7/1992 | Deutsch et al. | 119/51.12 |
| 5,230,300 | 7/1993 | Mezhinsky | 119/51.11 |

FOREIGN PATENT DOCUMENTS

| | | | |
|---|---|---|---|
| 2603161 | 3/1988 | France | 119/51.12 |

OTHER PUBLICATIONS

Rudolf F. Graf, "Encyclopedia of Electronic Circuits", vol. 1, 1985, p. 29.

*Primary Examiner*—Gene Mancene
*Assistant Examiner*—Thomas Price
*Attorney, Agent, or Firm*—Limbach & Limbach

[57] ABSTRACT

An animal feeding apparatus is disclosed. A preferred embodiment includes at least two chambers that each have a hollow passage therethrough to which access is provided by two openings positioned at opposite ends of each chamber. First and second receptacles for containing liquid have apertures in a lower portion thereof for releasing liquid therefrom. A support vertically supports the chambers one above the other so that one of the chambers is in an upper position and the other chamber is in a lower position and positions the chambers so that the hollow passage of the upper chamber is substantially aligned with the hollow passage of the lower chamber and so that the chambers are vertically higher than a feeding area. The support supports the second receptacle in a position that is vertically above the first receptacle. Upper and lower releasable blocking assemblies are associated with the upper and lower chambers, respectively, for supporting food within the hollow passages. First and second valves open the apertures in the first and second receptacles, respectively. A control system releases the upper and lower releasable blocking assemblies so that food contained in the hollow passage of the lower chamber falls out of the lower chamber to the feeding area and so that food contained in the hollow passage of the upper chamber falls out of the upper chamber and through the hollow passage of the lower chamber to the feeding area.

28 Claims, 17 Drawing Sheets

MODULAR ANIMAL FEEDING APPARATUS

BACKGROUND OF THE INVENTION

1. Field of the Invention

The present invention relates to devices used for feeding animals and, more particularly, to a modular animal feeding apparatus having a vertically stacked configuration that automatically releases separately contained servings of food at separate times.

2. Description of the Related Art

In today's busy society it is not uncommon for all members of a household to be away from their residence for extended periods of time due to long working hours, business travel, vacations, etc. Such absence from the household poses a problem for any pet animals, such as dogs and cats, that may be owned by a member of the household. Specifically, a pet owner may have to hire somebody to feed the pet, or, even less desirable, the pet may be required to wait an extended period of time to receive a meal.

There have been several attempts to design various devices to automatically feed pet animals. The devices disclosed in U.S. Pat. Nos. 5,230,300 to Mezhinsky, 4,735,171 to Essex, and 4,733,634 to Hooser, all suffer from the disadvantage that portions of food are delivered to the pet from the same container which requires that the pet eat the same type of food for each meal. The devices disclosed in U.S. Pat. Nos. 5,109,799 to Lader, 4,350,120 to Bittle, 4,069,793 to Gower, and 4,044,722 to Bradshaw, deliver food to the pet from separate containers but suffer from the disadvantage that they are rather large, bulky and occupy significant amounts of space. The devices disclosed in U.S. Pat. Nos. 4,485,765 to Schwartz et al. and 3,955,537 to Yujiri, also deliver food to the pet from separate containers but suffer from the disadvantage that they utilize complex rotating components that can easily become obstructed by food particles becoming lodged between moving parts.

Thus, there is a need for an animal feeding apparatus which overcomes the disadvantages of the above described devices.

SUMMARY OF THE INVENTION

The present invention provides an animal feeding apparatus that includes at least two chambers that each have a hollow passage therethrough to which access is provided by two openings positioned at opposite ends of each chamber. A support vertically supports the chambers one above the other so that one of the chambers is in an upper position and the other chamber is in a lower position. The support positions the chambers so that the hollow passage of the upper chamber is substantially aligned with the hollow passage of the lower chamber and so that the chambers are vertically higher than a feeding area. A releasable blocking assembly is associated with each chamber for releasably blocking the hollow passage of each chamber for supporting food within the hollow passage of each chamber. A control system releases each of the releasable blocking assemblies so that food contained in the hollow passage of the lower chamber falls out of the lower chamber to the feeding area and so that food contained in the hollow passage of the upper chamber falls out of the upper chamber and through the hollow passage of the lower chamber to the feeding area.

In another embodiment, the present invention provides an animal feeding apparatus that includes a chamber having a hollow passage therethrough to which access is provided by two openings positioned at opposite ends of the chamber. A receptacle for containing a liquid has an aperture in a lower portion thereof for releasing a liquid therefrom. A support vertically supports the chamber and the receptacle so that they are vertically higher than a feeding area. A releasable blocking assembly releasably blocks the hollow passage of the chamber for supporting food within the hollow passage of the chamber. A valve opens the aperture in the receptacle. The valve is triggered to open the aperture in the receptacle by the releasable blocking assembly when the releasable blocking means is released. A control system releases the releasable blocking assembly so that a serving of pet food in the hollow passage of the chamber falls out of the chamber to the feeding area and so that the releasable blocking assembly triggers the valve to open the aperture in the receptacle to release a liquid therefrom to the feeding area.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE PREFERRED EMBODIMENTS

Figure 1:
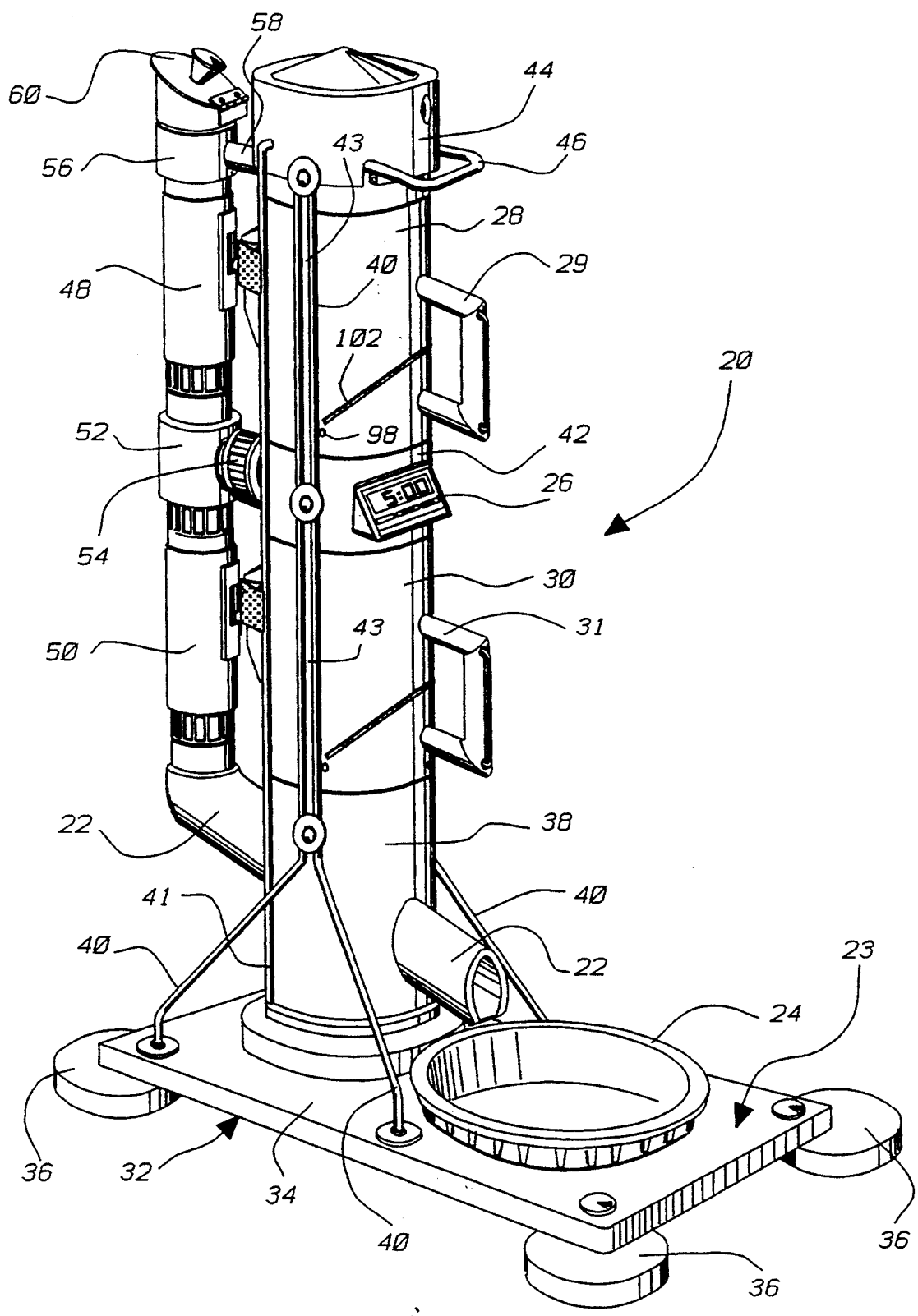
FIG. 1 is a perspective view of a modular animal feeding apparatus in accordance with the present invention.
Figure 2:
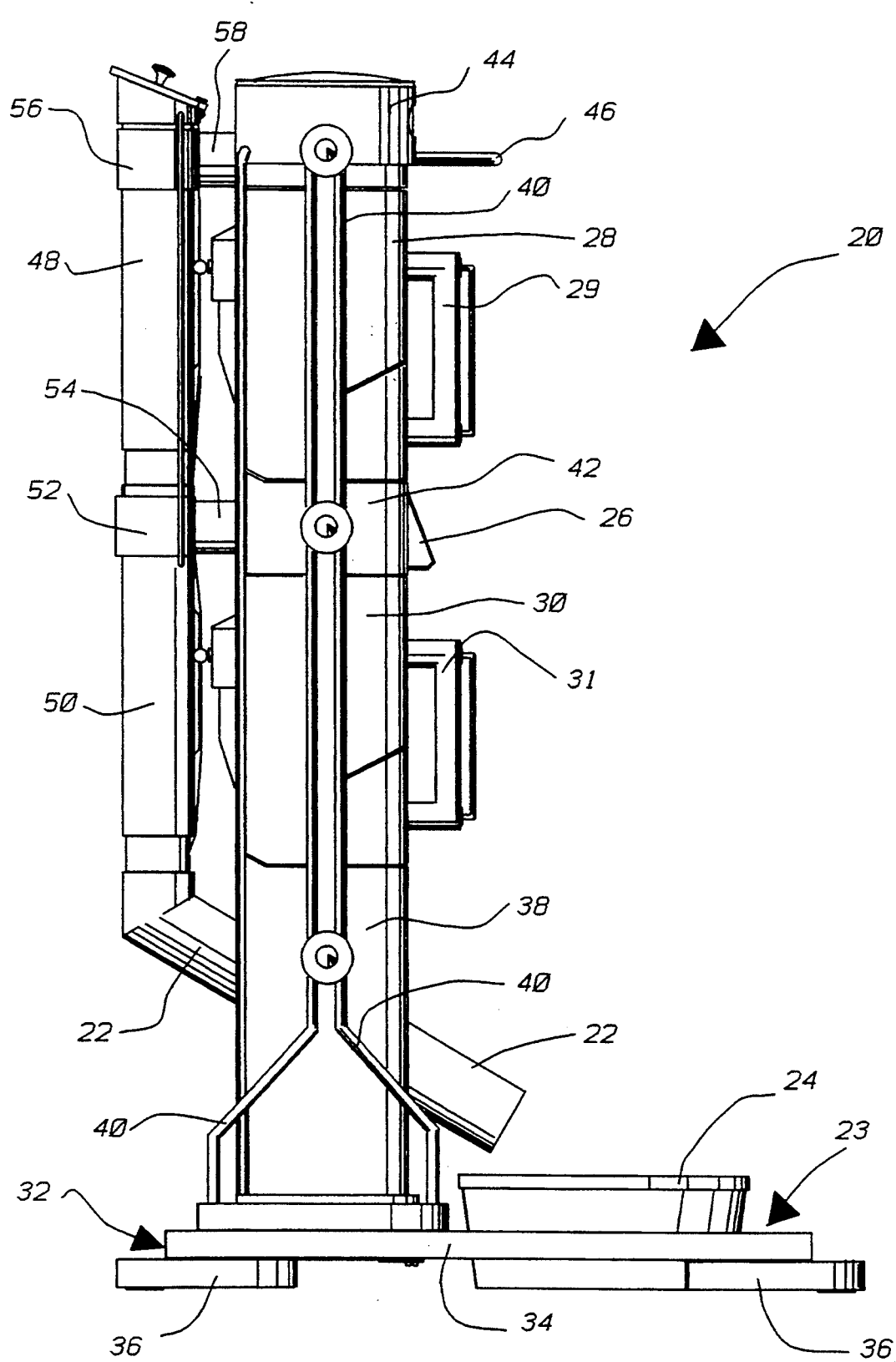
FIG. 2 is a side view of the modular animal feeding apparatus shown in FIG. 1.
Figure 3:
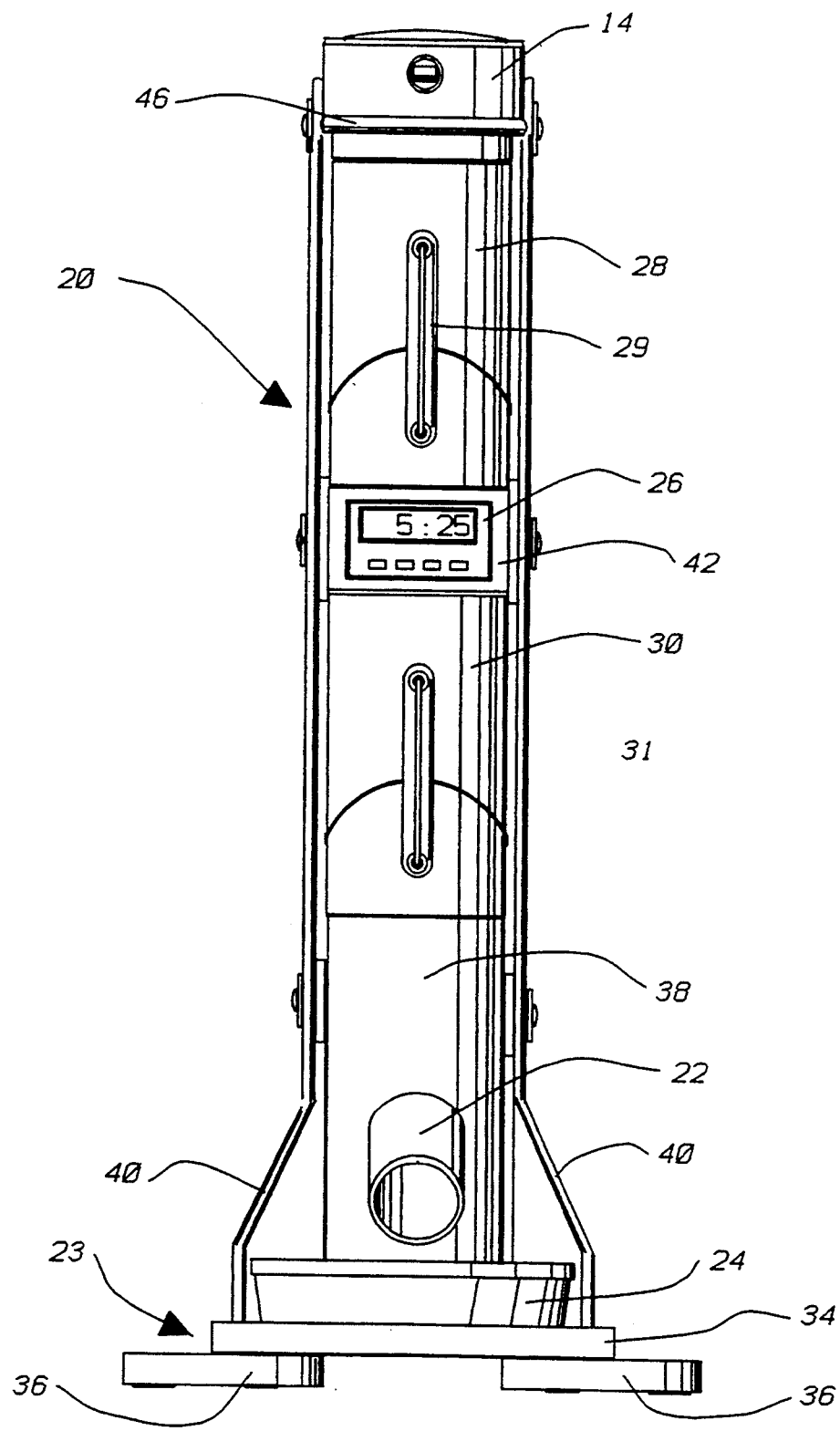
FIG. 3 is a front view of the modular animal feeding apparatus shown in FIG. 1.
Figure 4:
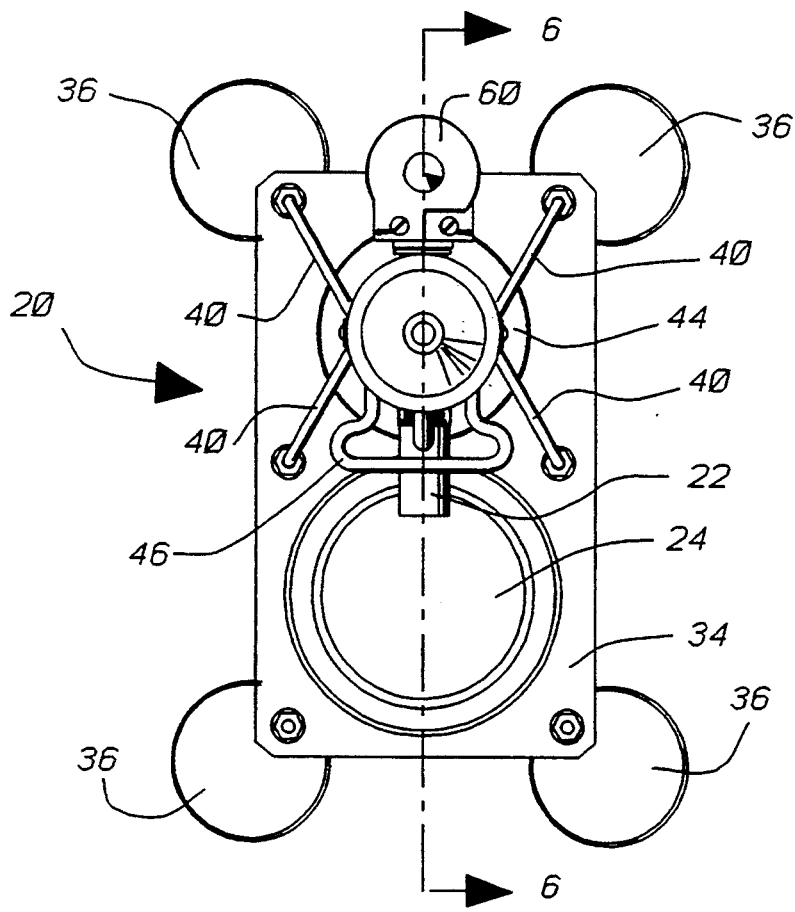
FIG. 4 is a top view of the modular animal feeding apparatus shown in FIG. 1.

Referring to FIGS. 1 through 4, there is illustrated a modular animal feeding apparatus 20 in accordance with the present invention. The apparatus 20 is particularly suited for feeding domestic pets such as dogs and cats, but it should be well understood that the modular animal feeding apparatus 20 may also be used to release food for feeding other types of animals such as, for example, wild rabbits squirrels, etc., as well as farm animals, such as chickens, goats, etc.

The apparatus 20 overcomes the disadvantages of the devices discussed above in that separately contained servings of food are delivered to the animal at separate times so that the animal does not have to eat the same type of food for each meal. Furthermore, the apparatus 20 has a vertically stacked configuration so that it does not occupy a large amount of space.

In general, the apparatus 20 operates by dispensing food from a delivery and mixing tube 22 at predetermined times. The food is dispensed to a feeding area 23 at which there is typically located a bowl 24 for receiving the food and for serving the food to the animal. The bowl 24 is preferably chew resistant so that it is not easily destroyed by, for example, dogs which normally have a natural tendency to chew on various objects. It should be understood that the feeding area 23 may include one bowl, such as the bowl 24, for receiving both food and liquid, or the feeding area 23 may include more than one bowl in order to keep food and liquid separate. The predetermined times at which food is released from the food delivery and mixing tube 22 may be set by an alarm clock 26, or, as will be discussed below, a photocell so that food is released at either dusk or dawn.

The apparatus 20 includes two chambers 28 and 30 for containing food. The chambers 28 and 30 are preferably identical and preferably have a mug-like configuration such that each includes a handle 29 and 31, respectively. The chambers 28 and 30 will normally each contain a predetermined quantity of food which is approximately equal to one serving for the particular animal to be fed.

The chambers 28 and 30 are vertically supported by a support structure 32 so that the chambers 28 and 30 are positioned one above the other, or "stacked", resulting in one of the chambers 28 being in an upper position and the other chamber 30 being in a lower position. Furthermore, the chambers 28 and 30 are supported such that they are vertically higher than the feeding area 23 so that the force of gravity carries food released from each chamber 28 and 30 to the feeding area 23. Because the chambers 28 and 30 are identical, their positions are interchangeable; i.e., the upper chamber 28 may be moved to the lower position and the lower chamber 30 may be moved to the upper position. Thus, the apparatus 20 has a modular characteristic.

The Figures referred to herein indicate that the modular animal feeding apparatus 20 utilizes only two chambers, i.e., the upper chamber 28 and the lower chamber 30. It should be well understood, however, that the apparatus 20 may include more than two chambers. Additional chambers are positioned or stacked above each other similar to the manner in which the upper chamber 28 is positioned above the lower chamber 30. For each additional chamber used, one additional serving of food can be provided to the animal. For example, if three chambers are used, then three separately contained servings of food can be provided to the animal at three separate times; if four chambers are used, the four separately contained servings of food can be provided, etc.

The support structure 32 includes a base support plate 34 having four legs 36 mounted to the bottom thereof. The lower chamber 30 rests on a support chamber 38 which is mounted to the base support plate 34. The food delivery and mixing tube 22 extends through the support chamber 38. Guide bars 40 are mounted to the base support plate 34 and are used to support a mid-section 42 on which the upper chamber 28 rests. The guide bars 40 also support a top section 44 which covers the upper chamber 28 and to which a carrying handle 46 is mounted. The mid-section 42 and the top section 44 are further supported by a second set of guide bars 41. The alarm clock 26, if used, may be mounted to the mid-section 42 as shown, or, alternatively, the alarm clock 26 may be mounted to the top section 44.

The food delivery and mixing tube 22 can be lengthened so that the support structure 32 and the chambers 28 and 30 can be located a longer distance from the feeding area 23 than is shown in FIG. 1. For example, the food delivery and mixing tube 22 can extend through a wall, fence, cage, etc. In this scenario, the support structure 32 and the chambers 28 and 30 would be located on one side of the wall or fence, and the food delivery and mixing tube 22 would extend through the wall or fence to the feeding area 23 located on the other side of the wall or fence. This is useful for periods of cold weather so that the animal can be fed outside and the chambers 28 and 30 and liquid containing receptacles 48 and 50 (discussed below) can be located inside. It is also useful for wild or aggressive animals that are kept in a cage or pen.

The apparatus 20 also includes two receptacles 48 and 50 for containing liquid. The purpose of the receptacles 48 and 50 is to release a liquid, such as water, milk, etc., into the food delivery and mixing tube 22 where the liquid is mixed with the dispensed food and then delivered to the bowl 24. Certain animals, such as dogs, like water or milk mixed into their food, especially if the food is ordinary dry dog food. Furthermore, the mixing of the liquid and food provides an efficient way to add medication to the food; i.e., medication can be added to the liquid and then when the liquid and food are mixed, the medication is mixed into the food. It should be understood, however, that the liquid may be directed to a different bowl within the feeding area 23 and be kept separate from the food in the bowl 24. The upper receptacle 48 contains the liquid that will be mixed with the food contained in the upper chamber 28, and the lower receptacle 50 contains the liquid that will be mixed with the food contained in the lower chamber 30. The manner in which the food and liquid in the respective chambers 28 and 30 and receptacles 48 and 50 is mixed will be discussed below.

The lower receptacle 50 is preferably positioned alongside and parallel to the lower chamber 30. The lower receptacle 50 is supported in this position by the food delivery and mixing tube 22 and a mid-support 52. The mid-support 52 is connected to the support structure 32 via a cross member 54 which is connected to the mid-section 42. The upper receptacle 48 is preferably positioned alongside and parallel to the upper chamber 28. The upper receptacle 48 is supported in this position by the mid-support 52 and a liquid filling member 56 which is connected to the support structure 32 via another cross member 58. The liquid filling member 56 has a cover 60 which is raised in order to fill the receptacles 48 and 50 with liquid. The receptacles 48 and 50, the food delivery and mixing tube 22, the mid-support 52, the cross member 54, and the liquid filling member 56 are preferably formed from PVC plastic tubing.

Figure 5:
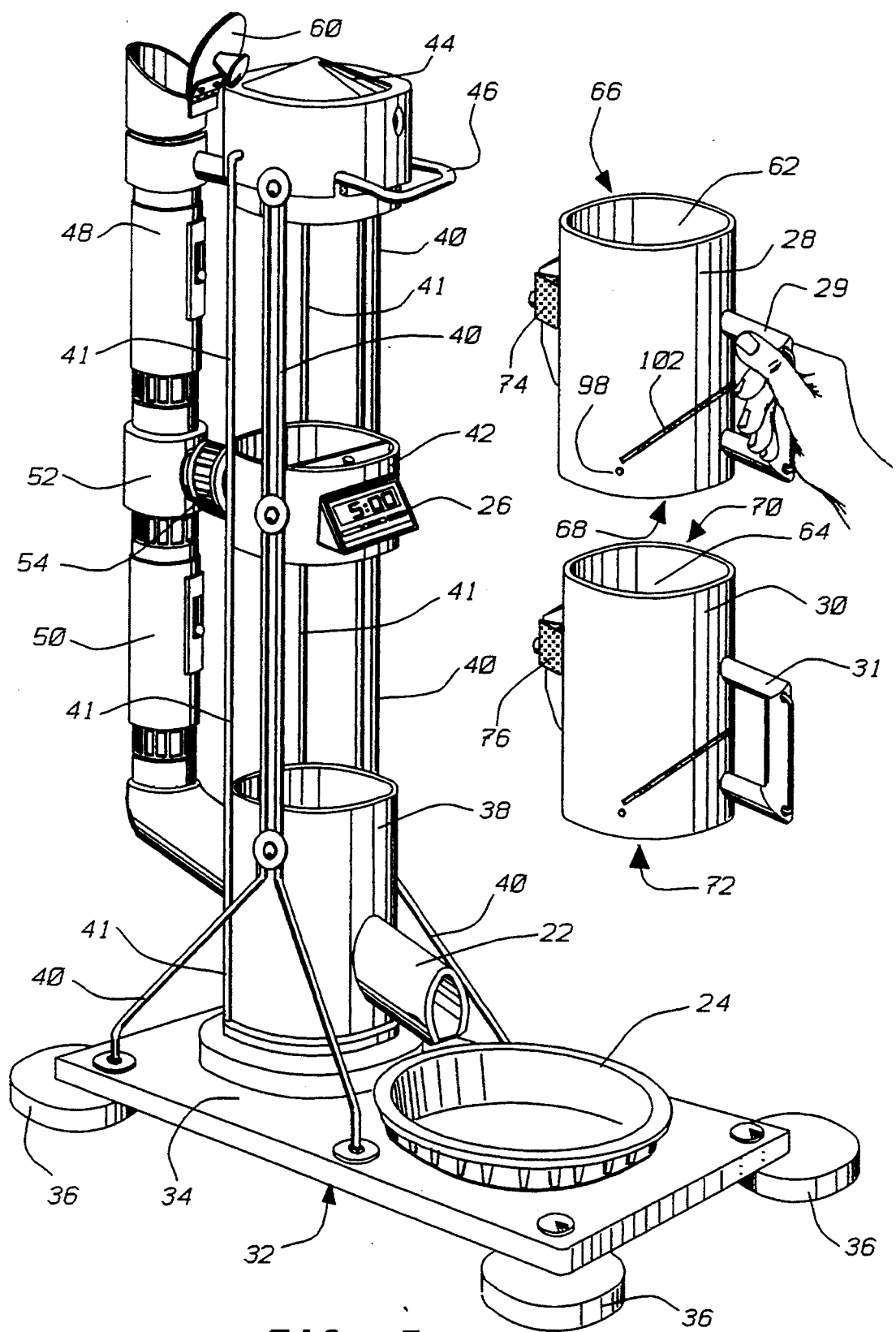
FIG. 5 is a perspective view of the modular animal feeding apparatus shown in FIG. 1 illustrating the removeability of the chambers.

FIG. 5 shows that the chambers 28 and 30 are preferably easily removable from the support structure 32, which is another example of their modular characteristic. Specifically, the chambers 28 and 30 are removed one at a time by simply grasping the handle 29 of the chamber 28 and pulling the chamber 28 out of the support structure 32. Because the chambers 28 and 30 can be completely removed from the support structure 32, and because of the convenient handles 29 and 31, the chambers 28 and 30 can easily be carried to another location where they can be filled with food.

Once removed, an amount of food is placed into each of the chambers 28 and 30, preferably an amount equal to one serving. One advantage of the chambers 28 and 30 is that the animal owner can predetermine the amount of food that the animal is to receive at each meal. For example, if the owner wants the animal to be served a large amount of food, such as for a large animal, a large amount of food can be put into one or both of the chambers 28 and 30; if, however, the owner wants the animal to be served a small amount of food, such as for a small animal, a small amount of food can be put into one or both of the chambers 28 and 30. Furthermore, if the owner wants the animal's first meal to be larger than the second, then a larger amount of food can be put into the lower chamber 30. On the other hand, if the owner wants the animal's second meal to be larger than the first, then a larger amount of food can be put into the upper chamber 28. Not only can the owner determine the size of each meal, but different types and mixtures of food can be placed into each chamber 28 and 30 so that the animal does not have to eat the same type of food for each meal. Medication may also be mixed into the food in either or both of the chambers 28 and 30.

Each of the chambers 28 and 30 has a hollow passage 62 and 64, respectively, therethrough to which access is provided by two openings 66 and 68, and 70 and 72, respectively. The openings 66 and 68 are positioned at opposite ends of the upper chamber 28, and the openings 70 and 72 are positioned at opposite ends of the lower chamber 30. The support structure 32 positions the chambers 28 and 30 so that the hollow passage 62 of the upper chamber 28 is substantially aligned with the hollow passage 64 of the lower chamber 30. As will be discussed in more detail below, the hollow passages 62 and 64 are aligned so that food released from the hollow passage 62 of the upper chamber 28 falls through the hollow passage 64 of the lower chamber 30 on its way to the food delivery and mixing tube 22.

The chambers 28 and 30 are preferably secured in the support structure 32 by means of sheet metal clips 74 and 76, respectively. The sheet metal clips 74 and 76 have a spring like action which causes them to spring outwardly and engage with the second set of guide bars 41 to secure the chambers 28 and 30 in the support structure 32. When pressure is applied to the handles 29 and 31 to pull the chambers out of the support structure 32, the clips 74 and 76 spring inward to release the chambers 28 and 30.

Figure 6:
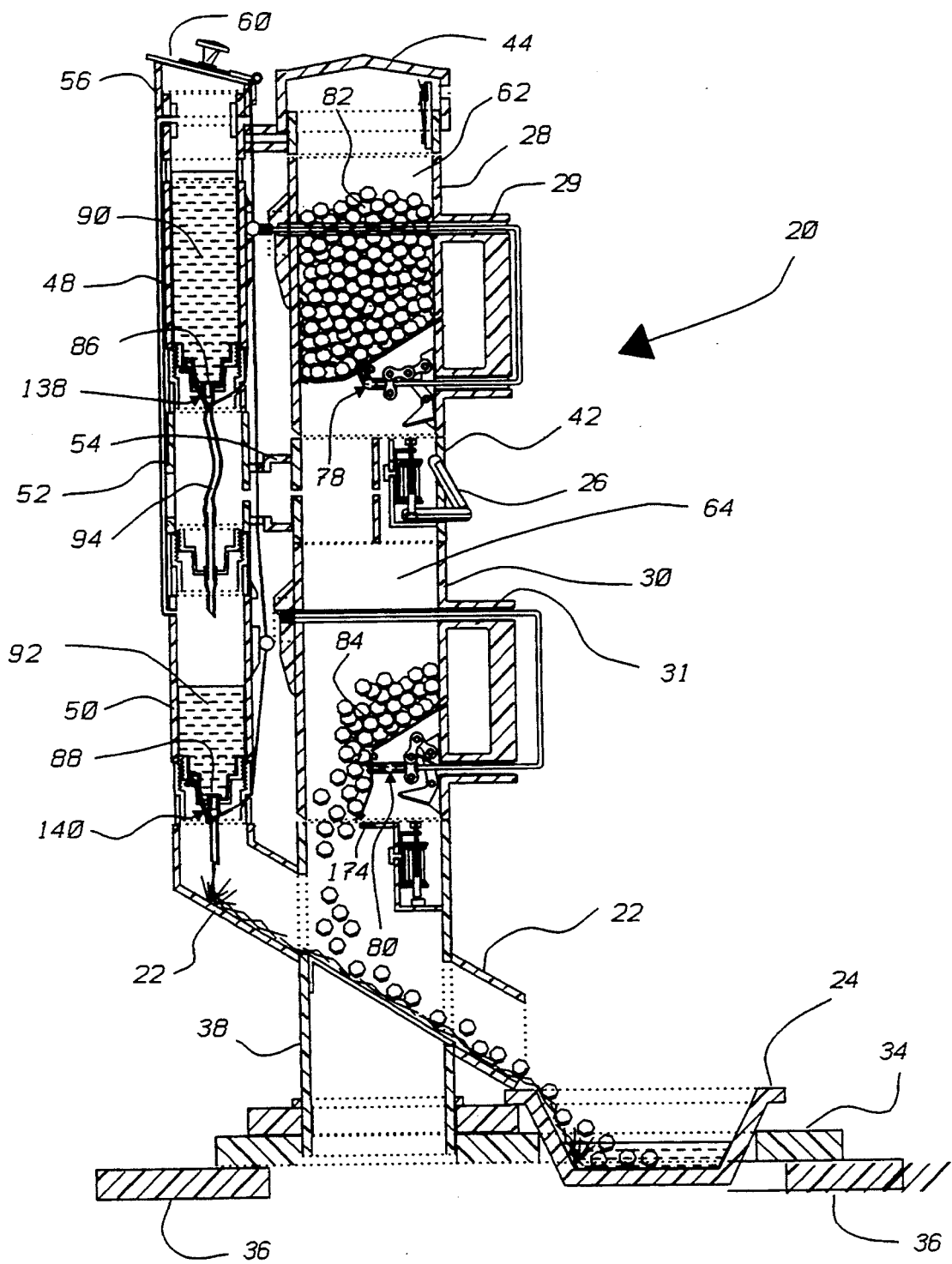
FIG. 6 is a cross-sectional view of the modular animal feeding apparatus shown in FIG. 4 taken along line 6—6.

FIG. 6 illustrates the internal operation of the apparatus 20. Releasable blocking assemblies 78 and 80 are mounted in the hollow passages 62 and 64 of the chambers 28 and 30, respectively. The purpose of the releasable blocking assemblies 78 and 80 is to releasably block the hollow passages 62 and 64 of each of the chambers 28 and 30 in order to support pet food 82 and 84 within the hollow passages 62 and 64. When the releasable blocking assemblies 78 and 80 are released, the food 82 and 84 falls out of the respective chambers 28 and 30.

The receptacles 48 and 50 have apertures 86 and 88, respectively, in a lower portion of each receptacle 48 and 50 for releasing a liquid 90 and 92 therefrom. Furthermore, the support structure 32 supports the lower receptacle 50 in a position that is vertically higher than the feeding area 23. The upper receptacle 48 is supported in a position that is vertically above the lower receptacle 50. Thus, the liquid 90 that is released from the aperture 86 in the upper receptacle 48 can flow through a rubber tube 94 into the lower receptacle 50.

At a first predetermined time, which is controlled by the alarm clock 26, the lower releasable blocking assembly 80 is released which allows the food 84 to fall through the food delivery and mixing tube 22 and into the bowl 24. The first predetermined time is referred to herein as the first time release. As will be discussed below, the release of the lower releasable blocking assembly 80 triggers the liquid 92 to be released from the lower receptacle 50 through the aperture 88. The liquid released from the aperture 88 drains directly into the food delivery and mixing tube 22. The food 84 and the liquid 92 mix together and are directed to the bowl 24 by the food delivery and mixing tube 22. The animal then eats the food 84 and liquid 92 from the bowl 24. Thus, the animal's first serving of food and liquid are contained in the lower chamber 30 and the lower receptacle 50.

Figure 7:
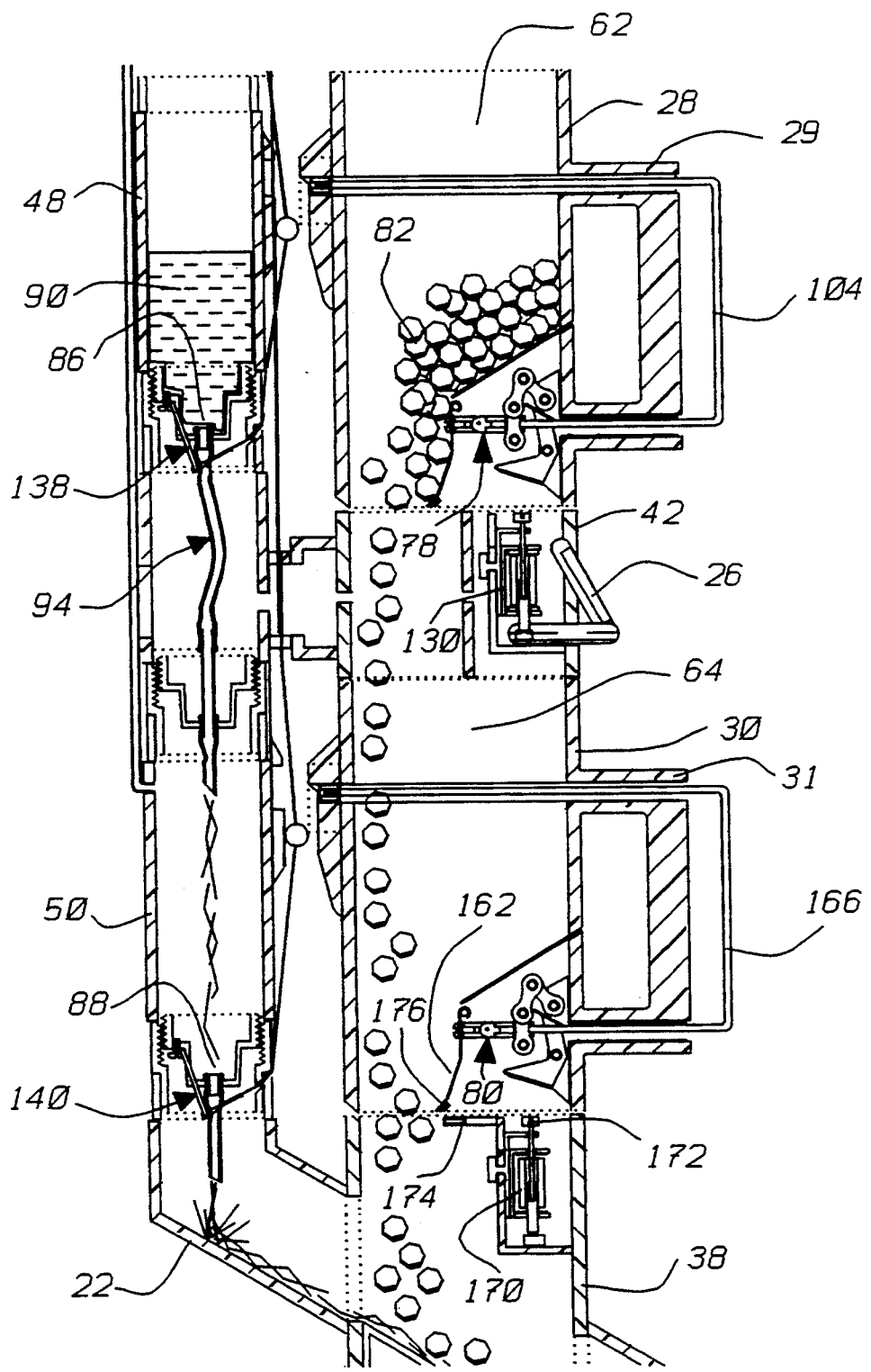
FIG. 7 is an enlarged, partial cross-sectional view taken along line 6—6 in FIG. 4.

Referring to FIG. 7, at a second predetermined time, referred to herein as the second time release, the upper releasable blocking assembly 78 is released which allows the food 82 to fall through the hollow passage 64 of the lower chamber 30, through the food delivery and mixing tube 22, and into the bowl 24. The release of the releasable blocking assembly 78 triggers the liquid 90 to be released from the upper receptacle 48 through the aperture 86. The liquid 90 released from the aperture 86 drains through the tube 94, through the lower receptacle 50, through the aperture 88, and into the food delivery and mixing tube 22. The food 82 and liquid 90 are then mixed together in the food delivery and mixing tube 22 and directed to the bowl 24. Thus, the animal's second serving of food and liquid are contained in the upper chamber 28 and the upper receptacle 48.

Figure 8:
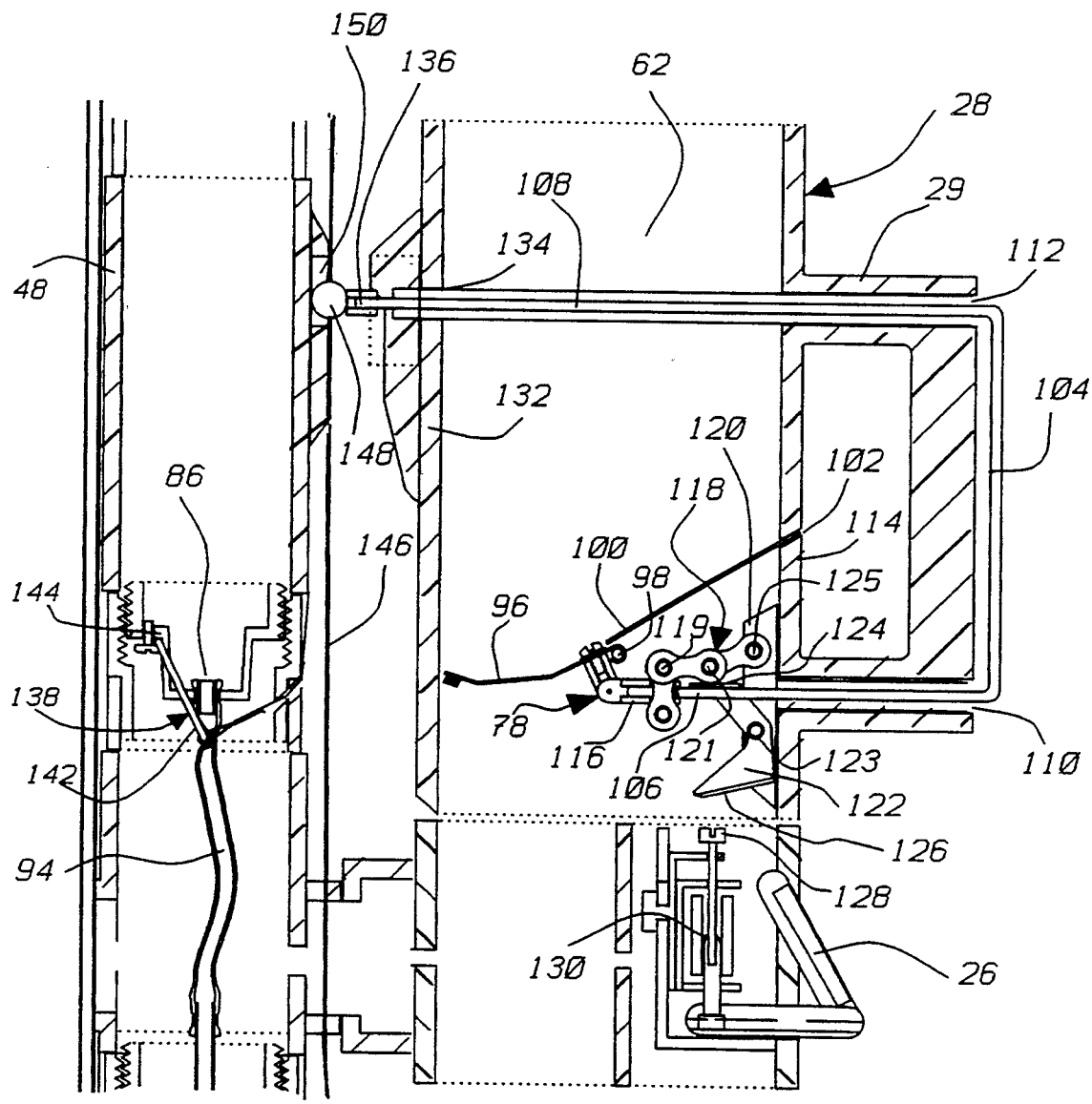
FIG. 8 is an enlarged, partial cross-sectional view taken along line 6—6 in FIG. 4 illustrating one of the chambers and one of the liquid containing receptacles.

FIG. 8 shows the detailed structure of the upper releasable blocking assembly 78 for the upper chamber 28. The lower releasable blocking assembly 80 for the lower chamber 30 is identical to the upper releasable blocking assembly 78. A flap 96 is hingedly connected to the chamber 28 at pivot point 98 inside the hollow passage 62. When the flap 96 is in the closed position, as shown in FIG. 8, it blocks at least a portion of the hollow passage 62. A hinge rod runs across the hollow passage 62 at pivot point 98 to provide a hinge for movement of the flap 96. A fixed blocking member 100 is fixedly secured in the hollow passage 62 to block the portion of the hollow passage 62 that is not blocked by the flap 96 when it is in the closed position. The fixed blocking member 100 is secured in the chamber 28 by insertion into a notch 102 in the walls of the chamber 28 (See FIG. 5). The flap 96 and the fixed blocking member 100 are preferably formed from sheet metal.

The flap 96 and the fixed blocking member 100 block the hollow passage 62 in order to support food within the hollow passage 62 when the flap 96 is in the closed position. When the releasable blocking assembly 78 is released, the flap 96 is moved to the open position to unblock the hollow passage 62 in order to allow food to fall out of the chamber 28.

As mentioned above, the release of the upper releasable blocking assembly 78 triggers the liquid contained in the upper receptacle 48 to be released through the aperture 86. The upper releasable blocking assembly 78 includes a trigger rod 104 to accomplish this task. Specifically, the trigger rod 104 has a shape such that the first end 106 and the second end 108 are substantially parallel to each other. The trigger rod 104 is slidably mounted to the chamber 28 so that the first end 106 and the second end 108 extend from outside of the chamber 28, through a first side 114 thereof, and into the hollow passage 62. Two channels 110 and 112 in the handle 29 receive the ends of the trigger rod 106 and 108. The channels 110 and 112 extend through the handle 29 and through the side 114 of the chamber 28. The channels 110 and 112 permit a sliding movement of the trigger rod 104 back and forth along the longitudinal axes of the first end 106 and the second end 108.

The first end 106 of the trigger rod 104 is connected inside the hollow passage 62 to be moved by the flap 96. Specifically, the first end 106 is connected to a threaded pivot mechanism 116 which is connected to the flap 96. A chain link trip mechanism 118 is connected between the pivot mechanism 116 and a mount 120 that is secured to the wall inside the hollow passage 62. The chain link trip mechanism 118 has three pivot points 119, 121, and 125. A trigger lever 122 is pivotally connected to the mount 120 at pivot point 123 between its ends 124 and 126. The end 124 of the trigger lever 122 makes contact with the chain link trip mechanism 118, and the other end 126 of the trigger lever 122 is positioned to have pressure applied to it by the plunger 128 of a solenoid. The solenoid 130 is part of the control system of the apparatus 20 and will be described in more detail below.

Figure 9A:
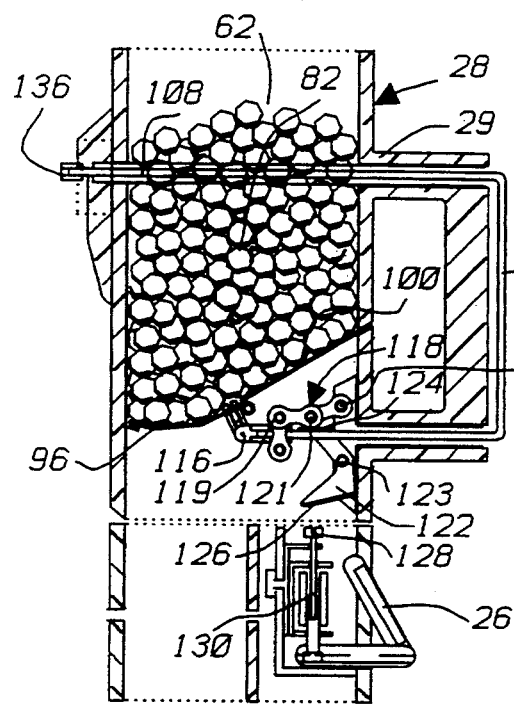
FIGS. 9A through 9D are enlarged, partial. cross-sectional views taken along line 6—6 in FIG. 4 illustrating the operation of one of the releasable blocking assemblies.

Referring to FIG. 9A, when the flap 96 is in the closed position, the pivot point 121 of the chain link trip mechanism 118 is positioned lower than the pivot points 119 and 125. This forces the pivot point 121 down against the end 124 of the trigger lever 122. Because the trigger lever 122 cannot move down any further, the chain link trip mechanism 118 is locked in position and the flap 96 is held in the closed position.

Figure 9B:
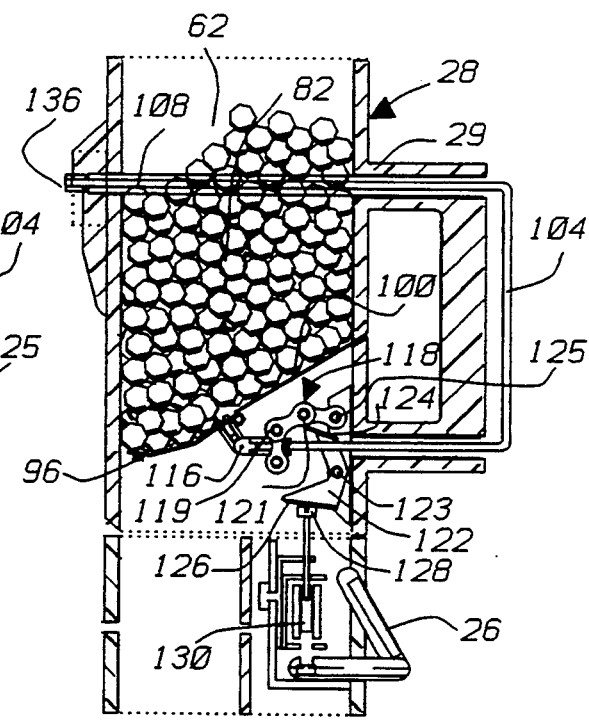

Referring to FIG. 9B, when the solenoid 130 is activated, the plunger 128 quickly rises and applies pressure to the end 126 of the trigger lever 122. This causes the trigger lever 122 to rotate around the pivot point 123 so that the other end 124 applies pressure to the pivot point 121 of the chain link trip mechanism 118. The plunger 128 causes the pivot point 121 to move up just far enough so that it is higher than the other pivot points 119 and 125.

Figure 9C:
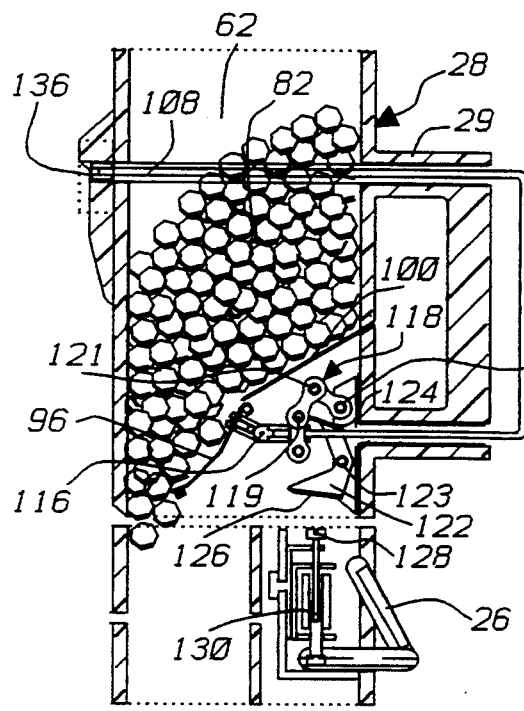

Referring to FIG. 9C, because there is nothing stopping the chain link trip mechanism 118 from rising, the pivot point 121 continues to rise above the other pivot points 119 and 125. The weight of the food 82 on the flap 96 causes the flap 96 to move down and the trigger rod 104 to slide away from the handle 29. The food 82 begins to fall out of the chamber 28.

Figure 9D:
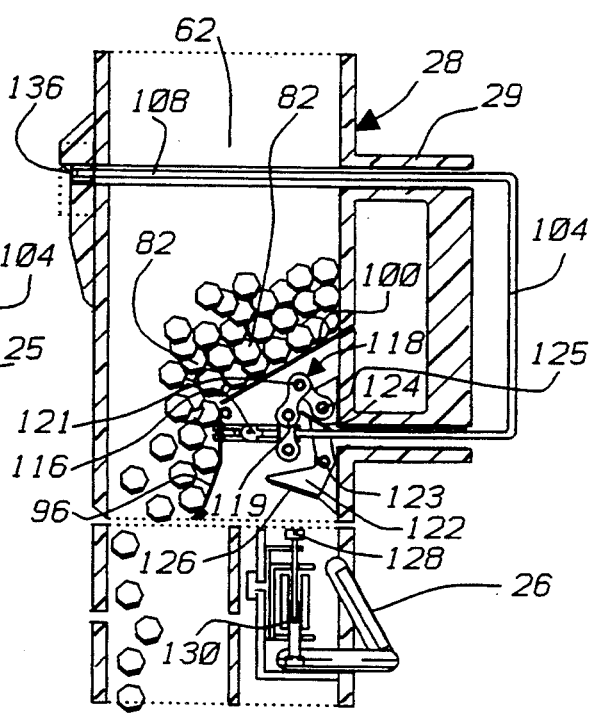

Referring to FIG. 9D, the pivot point 121 continues to rise and the trigger rod 104 continues to slide until the flap 96 is moved all the way to the open position. Approximately one-half of the hollow passage 62 remains blocked by the fixed blocking member 100. However, because the fixed blocking member 100 is secured in the chamber 28 at an angle that slants down towards the flap 96, all of the food 82 is able to fall through the open portion of the hollow passage 62.

Referring back to FIG. 8, the other end 108 of the trigger rod 104 extends all the way across the hollow passage 62 and through a channel 134 in the side 132 of the chamber 28. The side 132 of the chamber 28 is opposite the side 114. A restraining member 136 is threaded onto the end 108 of the trigger rod 104. Movement of the flap 96 causes both ends 106 and 108 of the trigger rod 104 to slide along their longitudinal axes. This movement causes the restraining member 136 to move to and from the chamber 28 which triggers the release of liquid from the upper receptacle 48.

Referring back to FIGS. 6 and 7, an upper valve 138 is used to open the aperture 86 in the upper receptacle 48 and a lower valve 140 is used to open the aperture 88 in the lower receptacle 50. The upper valve 138 is triggered to open the aperture 86 when the upper releasable blocking assembly 78 is released, and the lower valve 140 is triggered to open the aperture 88 when the lower releasable blocking assembly 80 is released.

FIG. 8 shows the detailed structure of the upper valve 138. The lower valve 140 is substantially the same as the upper valve 138. A rubber tube 94 is connected to the aperture 86 in the upper receptacle 48. A pinching wire 142 has both of its ends connected to the upper receptacle 48 next to the aperture 86 by means of screws 144. The pinching wire 142 has a squared-off U-shape, i.e., rectangular in shape with one open side. A cord 146 has one end thereof secured to the pinching wire 142. The other end of the cord 146 is secured to the cover 60 of the liquid filling member 56.

When tension is put on the cord 146, the pinching wire 142 is pulled against the rubber tube 94 to pinch the rubber tube 94 which stops liquid from being released therefrom. A catch 148 is secured to the cord 146 for engaging with the restraining member 136 that is secured to the end 108 of the trigger rod 104. When the restraining member 136 engages with the catch 148 such that the catch 148 is held in a notch 150 in the side of the upper receptacle 48, tension is maintained on the cord 146. As long as tension is maintained on the cord 146, the aperture 86 is closed. The restraining member 136 holds the catch 148 in the notch 150 when the flap 96 is in the closed position.

When the releasable blocking assembly 78 is released and the flap 96 moves to the open position, the trigger rod 104 slides towards the right side of FIG. 8. This causes the restraining member 136 to withdraw from the catch 148. When the restraining member 136 moves away from the catch 148, the tension on the cord 146 pulls the catch 148 out of the notch 150. When the catch 148 is pulled out of the notch 150, tension in the cord 146 is released and the cord 146 slacks. The slack in the cord 146 causes the pinching wire 142 to move away from and unpinch the rubber tube 94. Because the rubber tube is unpinched, liquid can flow through the aperture 86 and the rubber tube 94.

In the embodiment of the modular animal feeding apparatus 20 shown in FIGS. 6, 7, and 8, the lower valve 140 is triggered to open the aperture 88 in the lower receptacle 50 by the lower releasable blocking assembly 80 being released, and the upper valve 138 is triggered to open the aperture 86 in the upper receptacle 48 by the upper releasable blocking assembly 78 being released. In other words, the upper and lower releasable blocking assemblies 78 and 80 are first released and then the action of the respective trigger rods 104 and 166 causes the upper and lower valves 138 and 140 to open. It should be understood, however, that the upper and lower valves 138 and 140 may be triggered directly by the same control system that triggers the release of the upper and lower releasable blocking assemblies 78 and 80. For example, electronically controlled valves may be used for the upper and lower valves 138 and 140. The electronically controlled valves would be wired directly to the control system for the apparatus 20 (discussed below). In this scenario, the upper and lower valves 138 and 140 would not be triggered by the upper and lower releasable blocking assemblies 78 and 80, but rather, would be triggered directly by the control system. The control system would trigger the electronically controlled valves to open when the corresponding releasable blocking assemblies are released.

Figures 10A, 10B:
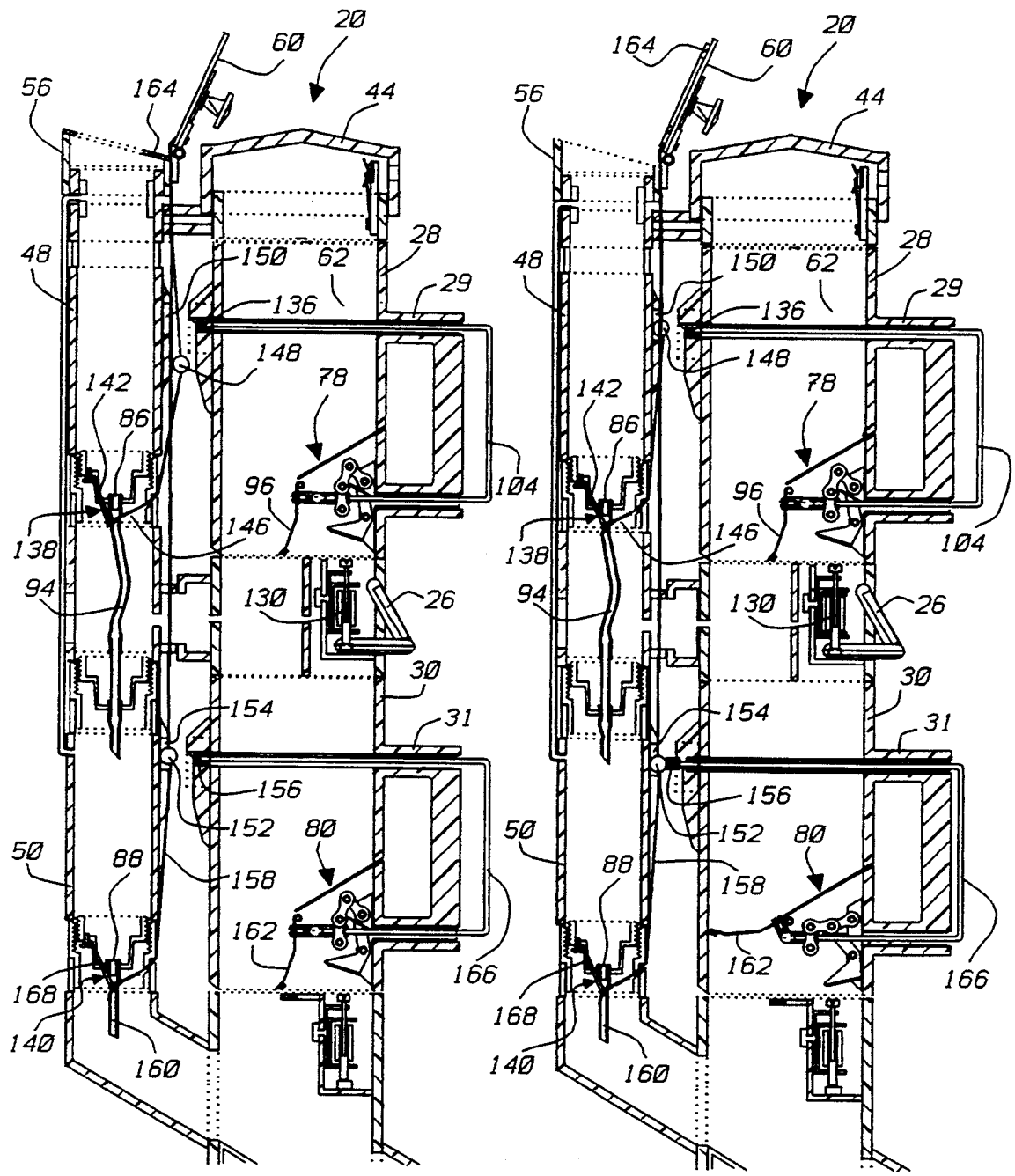
FIGS. 10A through 10D are partial cross-sectional views taken along line 6—6 in FIG. 4 illustrating the operation of the valves and liquid filling member cover.

FIGS. 10A through 10D illustrate the manner in which the releasable blocking assemblies 78 and 80 and the valves 138 and 140 are reset. FIG. 10A shows the apparatus 20 after both the upper and lower releasable blocking assemblies 78 and 80 have been released. In other words, the flap 96 of the upper releasable blocking assembly 78 and the flap 162 of the lower releasable blocking assembly 80 are both in the open position. In order to reset the apparatus 20, the lower chamber 30 is removed. The trigger rod 166 of the lower chamber 30 is pushed in towards the handle 31. This causes the flap 162 to move to the closed position. The first serving of food is then placed into the hollow passage 64.

Before the chamber is placed back into the support structure 32, the cover 60 of the liquid filling member 56 is raised. The cord 158 of the lower valve 140 is connected to the cover 60 such that when the cover 60 is raised, the cord 158 is pulled tight. Pulling the cord 158 tight causes the catch 152 to move into the notch 154 in the lower receptacle 50. When the catch 152 is in the notch 154, tension is put on the cord 158 such that the pinching wire 168 pinches the tube 160 to close the aperture 88.

The lower chamber 30 is then placed back into the support structure 32. As shown in FIG. 10B, the restraining member 156 of the lower trigger rod 166 engages with the catch 152 to hold it in the notch 154. The first serving of liquid is then poured into the liquid filling member 56. Because there is no tension on the cord 146 for the upper valve 138, the liquid flows through the upper receptacle 48, through the aperture 86, through the tube 94, and into the lower receptacle 50 where it is held until the first serving of food and liquid is released.

Figure 11:
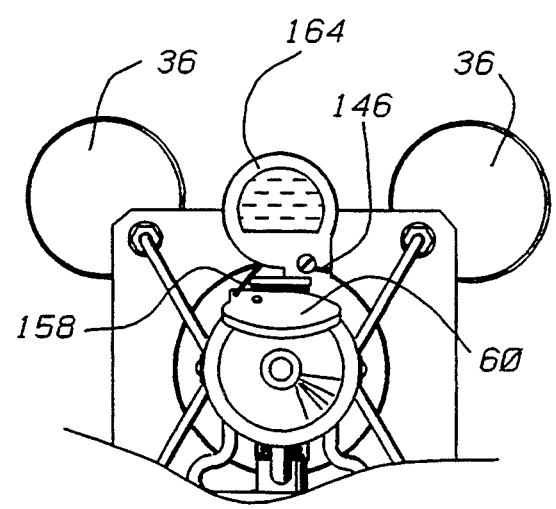
FIG. 11 is a partial top view of the modular animal feeding apparatus shown in FIG. 1.

Next, the upper chamber 28 is removed from the support structure 32. The trigger rod 104 is pushed in towards the handle 29 which moves the flap 96 to the closed position. The second serving of food is placed into the hollow passage 62 and the upper chamber 28. Before the upper chamber 28 is placed back into the support structure 32, a second inner cover 164 located just below the cover 60 is raised. FIG. 11 shows that the cord 146 for the upper valve 138 is connected to the inner cover 164. When the inner cover 164 is raised, as shown in FIG. 10B, tension is put on the cord 146. This tension on the cord 146 pulls the catch 148 into the notch 150 and the pinching wire 142 against the tube 94 to pinch it closed.

Figures 10C, 10D:
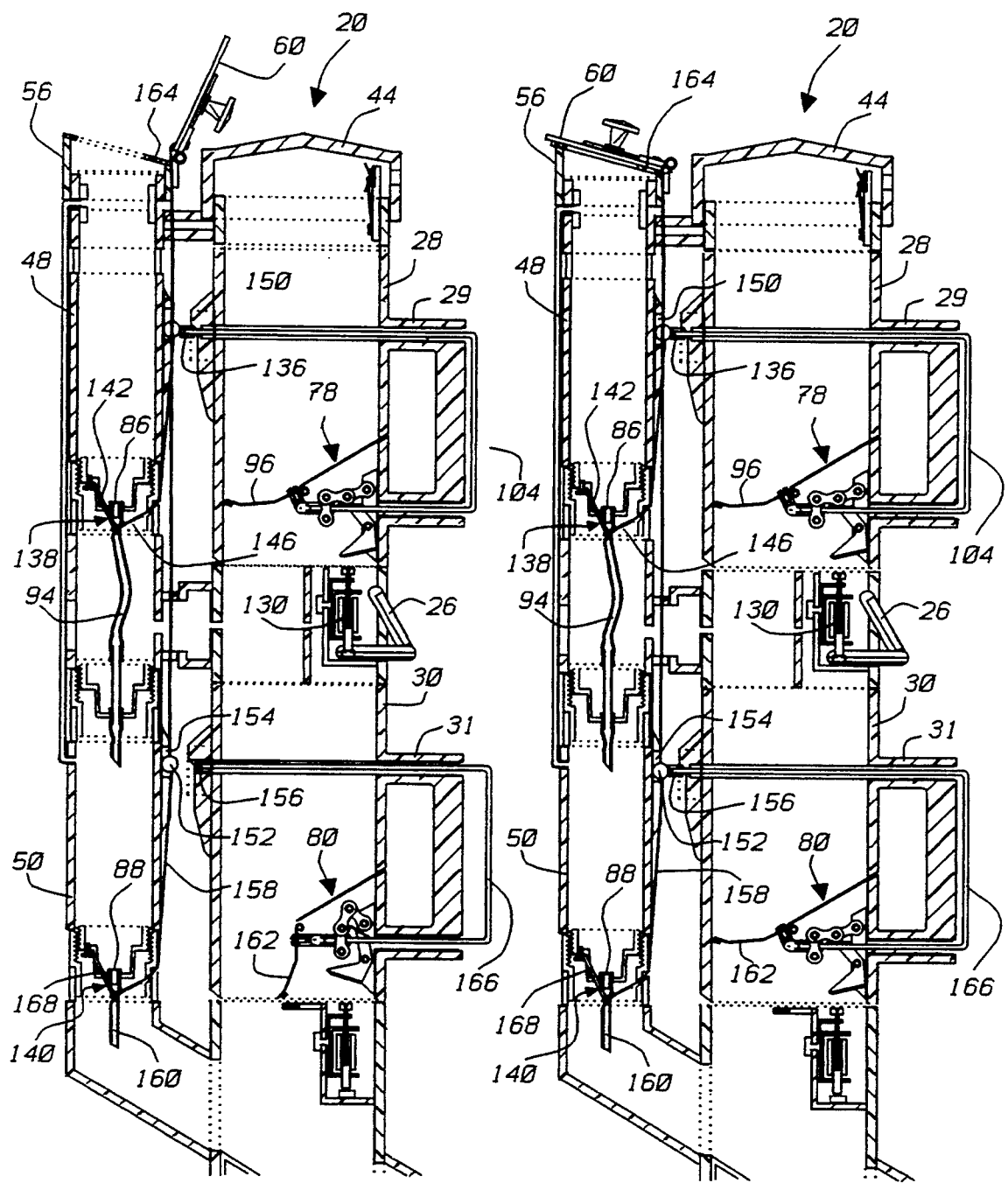

The upper chamber 28 is then placed back into the support structure 32 as shown in FIG. 10C. The restraining member 136 of the trigger rod 104 engages with the catch 148 to hold it in the notch 150. The second serving of liquid is then poured into the liquid filling member 56. Because the tube 94 is pinched by the pinching wire 142, the liquid remains in the upper receptacle 48. Both the inner cover 164 and the cover 60 can then be closed as shown in FIG. 10D. The apparatus 20 is then ready for the alarm clock 26 to be set.

Figure 12:
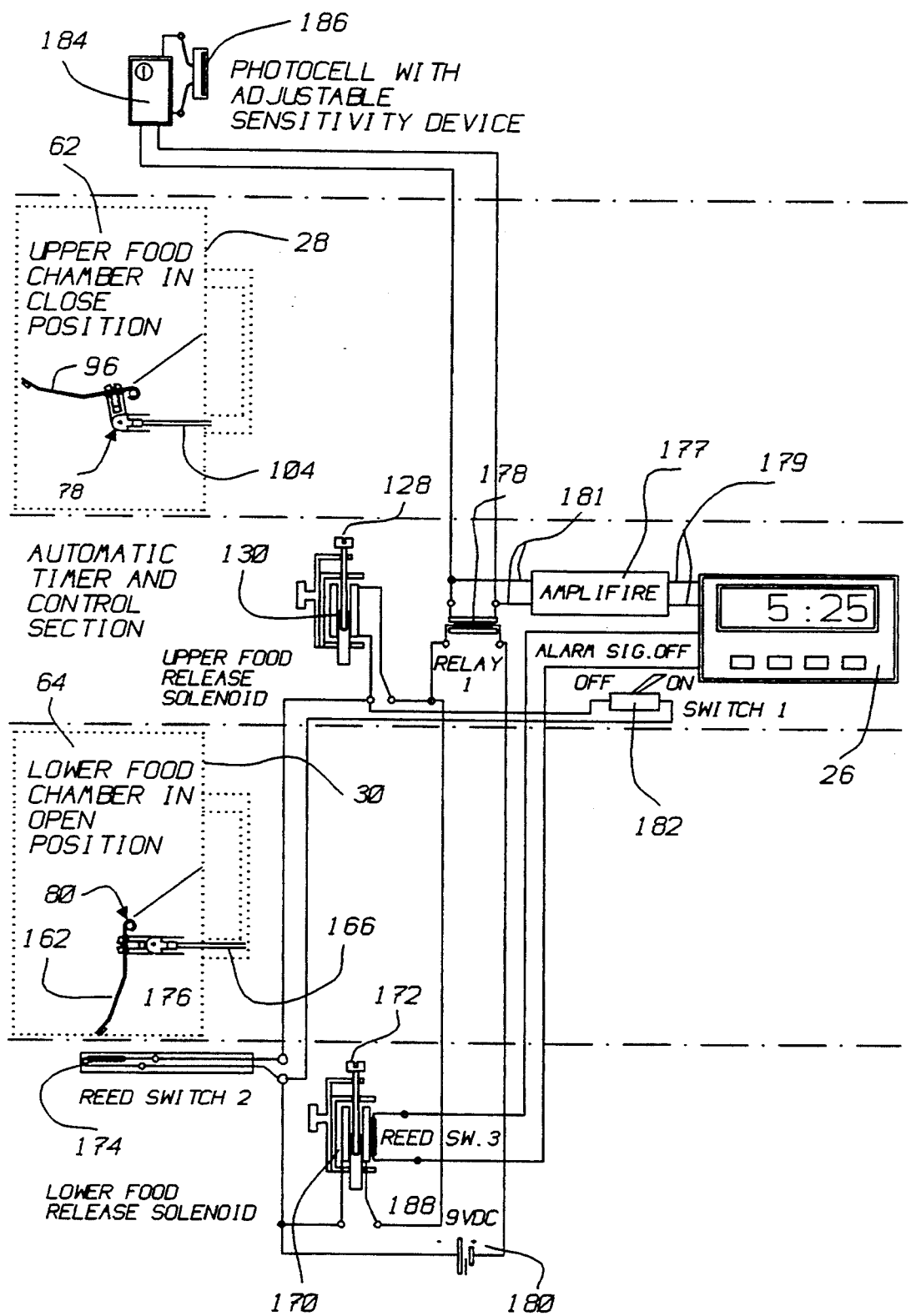
FIG. 12 is a schematic diagram illustrating the control system of the modular animal feeding apparatus shown in FIG. 1.

FIG. 12 shows a control system that may be used for releasing the upper and lower releasable blocking assemblies 78 and 80. Normally, a user sets the alarm clock 26 to provide two alarm signals at times when the user desires his or her animal to be fed. When the first alarm signal occurs, the lower releasable blocking assembly 80 is released so that the food in the hollow passage 64 of the lower chamber 30 falls into the bowl 24. The release of the lower releasable blocking assembly 80 triggers the lower valve 140 to open the aperture 88 in the lower receptacle 50. Liquid contained in the lower receptacle 50 drains into the bowl 24. When the second alarm signal occurs, the upper releasable blocking assembly 78 is released so that the food in the hollow passage 62 of the upper chamber 28 falls out of the upper chamber 28, through the hollow passage 64 of the lower chamber 30, and into the bowl 24. The release of the upper releasable blocking assembly 78 triggers the upper valve 138 to open the aperture 86 in the upper receptacle 48. Liquid contained in the upper receptacle drains through the tube 94, through the lower receptacle 50, and into the bowl 24.

The control system includes an amplifier 177 that is connected to receive the alarm signal generated by the alarm clock 26. By way of example, the alarm clock 26 may be a Westclox Quartz 24 Hour Alarm Clock. The amplifier 177, which will be discussed in more detail below, amplifies the weak alarm signal generated by the alarm clock 26 and provides the amplified signal to a relay 178. The relay 178 is preferably a reed switch type relay which has a reed switch surrounded by a coil.

The output terminals of the relay 178 are connected between the positive terminal of a 9 Volt DC battery 180 and one of the input terminals of the lower solenoid 170. The other input terminal of the lower solenoid 170 is connected directly to the negative terminal of the battery 180. The output terminals of the relay 178 are also connected between the positive terminal of the battery 180 and one of the input terminals of the upper solenoid 130. A reed switch 174 is inserted between the other input terminal of the upper solenoid 130 and the negative terminal of the battery 180. A bypass on/off switch 182 is connected across the terminals of the reed switch 174 in order to bypass the reed switch 174. Another reed switch 188 is attached to the lower solenoid 170. The terminals of the reed switch 188 are connected to the alarm signal off inputs of the alarm clock 26.

A photocell 184 may be connected to the inputs of the relay 178 along with the alarm clock 26 or instead of the alarm clock 26. The photocell 184 will cause the upper and lower releasable blocking assemblies 78 and 80 to be released when the light sensed by the photocell 184 changes, for example, at dusk or dawn if the apparatus 20 is located outside. An adjustable sensitivity device 186 may used with the photocell 184 to adjust the intensity of light required to trigger the photocell 184.

During operation, the first alarm signal generated by the alarm clock 26 causes the circuit between the output terminals of the relay 178 to close. When the output terminals of the relay 178 close, power is applied to the lower solenoid 170 and the plunger 172 rises to release the lower releasable blocking assembly 80. As soon as the plunger 172 rises, the magnetic field created by the lower solenoid 170 causes the reeds of the reed switch 188 to make contact. This causes the alarm signal generated by the alarm clock 26 to stop.

The first alarm signal generated by the alarm clock 26 does not activate the upper solenoid 130. Specifically, the reeds of the reed switch 174 initially do not make contact. Because the reeds of the reed switch do not make contact, the circuit between the negative terminal of the battery 180 and the input terminal of the upper solenoid 130 is open. However, after the lower releasable blocking assembly 80 has been released, the flap 162 moves to the open position. When the flap 162 moves to the open position, a small magnet 176 attached to the end of the flap 162 moves near the reed switch 174. The presence of the magnet 176 causes the reeds of the reed switch 174 to make contact. Because the flap 162 remains in the open position, the reeds of the reed switch 174 remain in contact.

When the alarm clock 26 generates the second alarm signal, the circuit between the output terminals of the relay 178 is again closed. Power is again applied to the input terminals of the lower solenoid 170, and, this time, because the reeds of the reed switch 174 are in contact with each other, power is also applied to the input terminals of the upper solenoid 130. The lower solenoid 170 is again activated, but, because the lower releasable blocking assembly 80 has already been released, movement of the plunger 172 has no effect. Activation of the upper solenoid 130 causes the plunger 128 to rise and release the upper releasable blocking assembly 130. As with the first alarm signal, activation of the lower solenoid 170 causes the reeds of the reed switch 188 to make contact and turn the second alarm signal off.

Referring back to FIG. 7, the reed switch 174 is positioned just below the lower releasable blocking assembly 80. When the flap 162 moves to the open position, the magnet 176 is moved into close proximity with the reed switch 174.

Referring back to FIG. 1, the wires for the control system may be routed around the apparatus 20 by inserting the wires through a plastic, rubber, or similar tube 43. The tube 43 is located between the guide bars 40 and runs vertically along the chambers 28 and 30.

Referring back to FIG. 12, the bypass on/off switch 182 is used to bypass the reed switch 174. When the reed switch 174 is bypassed, the input terminals of the upper solenoid 130 are connected to the battery 180 in the same manner as the input terminals of the lower solenoid 170. Therefore, on the first alarm signal generated by the alarm clock 26, both the upper and lower solenoids 130 and 170 are activated. This causes the both the upper and lower releasable blocking assemblies 78 and 80 to be released which causes the food in both chambers 28 and 30 to be served to the animal at the same time, A pet owner may desire that both servings of food be provided to the animal at the same time if, for example, the animal is very large.

Figure 13:
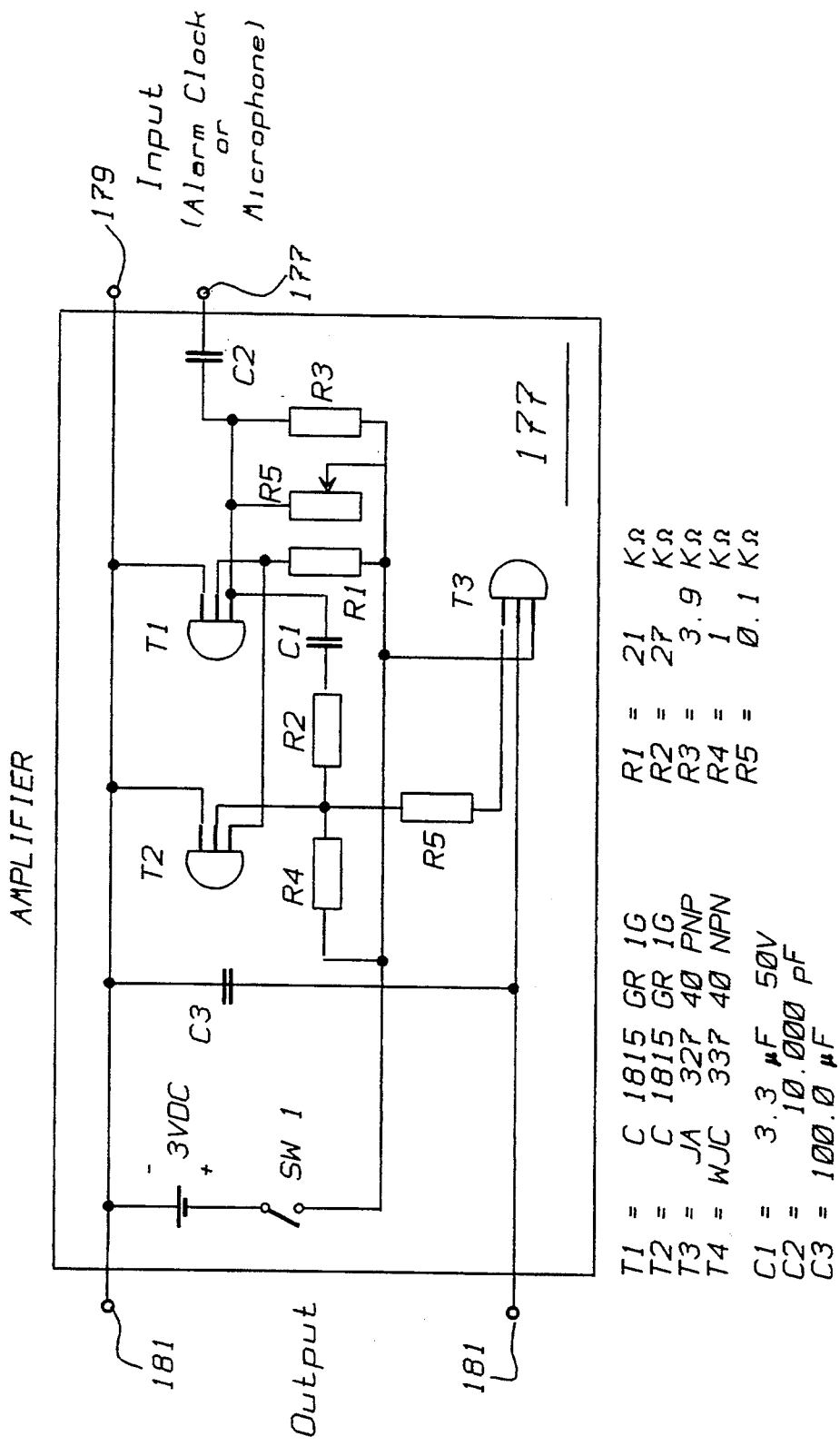
FIG. 13 is a schematic diagram illustrating an amplifier that may be used for the amplifier shown in FIG. 12.
Figure 14:
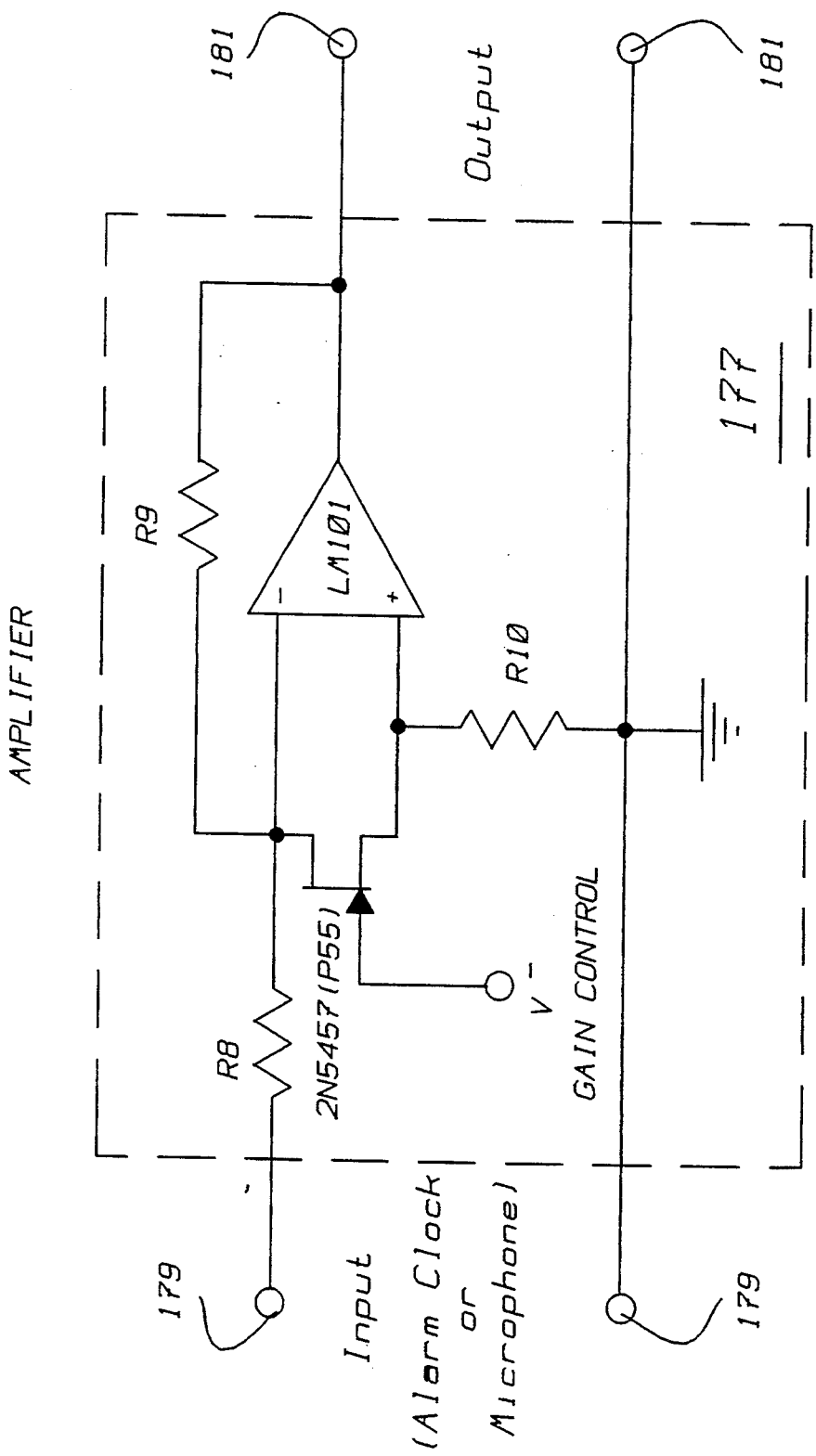
FIG. 14 is a schematic diagram illustrating another amplifier that may be used for the amplifier shown in FIG. 12.

An amplifier that may be used for the amplifier 177 is shown in FIG. 13. The amplifier 177 receives the alarm signal from the alarm clock 26 at inputs 179 and outputs the amplified alarm signal to the relay 178 at outputs 181. Transistors T1 and T2 are npn bipolar transistors, and transistor T3 is a pnp bipolar transistor. The preferred values of the resistors are as follows: $R1 = 22$ K$\Omega$, $R2 = 28$ K$\Omega$, $R3 = 3.9$ M$\Omega$, $R4 = 1$ K$\Omega$, and $R5 = 0.1$ K$\Omega$. The preferred values of the capacitors are as follows: $C1 = 3.3$ $\mu$F, 50 V, $C2 = 10,000$ pF, and $C3 = 100.0$ $\mu$F, 100 V. Another amplifier that may be used for the amplifier 177 is shown in FIG. 14. A reproduction and description of the schematic shown in FIG. 14 may be found on page 29 of the book entitled "Encyclopedia of Electronic Circuits", Volume 1, by Rudolf F. Graf, published by TAB Books, 1985.

The amplifier 177 is used because the alarm signal generated by the Westclox alarm clock 26 is not strong enough to activate the relay 178 directly. If, however, an alarm clock having a stronger alarm signal is used for the alarm clock 26, the amplifier 177 will not be necessary. Alternatively, if a relay is used for the relay 178 that can be activated by the Westclox alarm clock 26 alarm signal, the amplifier 177 will also not be necessary.

The control system shown in FIG. 12 uses either an alarm clock 26 or a photocell 184, or both, to trigger the relay 178, and thus, the solenoids 130 and 170. It should be understood that the control system of the present invention may utilize other devices to trigger the solenoids 130 and 170. For example, a simple countdown timer or other type of timer may be used. It is also envisioned that the control system may be activated by means of a telephone. Specifically, a telephone may be used to activate the solenoids 130 and 170 by providing circuitry which interfaces the solenoids to a conventional telephone pager or to a telephone remote control device, such as a conventional telephone answering machine. Furthermore, a microphone may be connected directly to the inputs 179 of the amplifier 177. The microphone output would be amplified by the amplifier 177 and be used to activate the relay 178, and thus the solenoids 130 and 170, by sound.

As mentioned above, it should be understood that the control system may be positioned in a variety of locations on the support structure 32, including the middle (as shown), the top, or the bottom near the base support plate 34.

Figure 15:
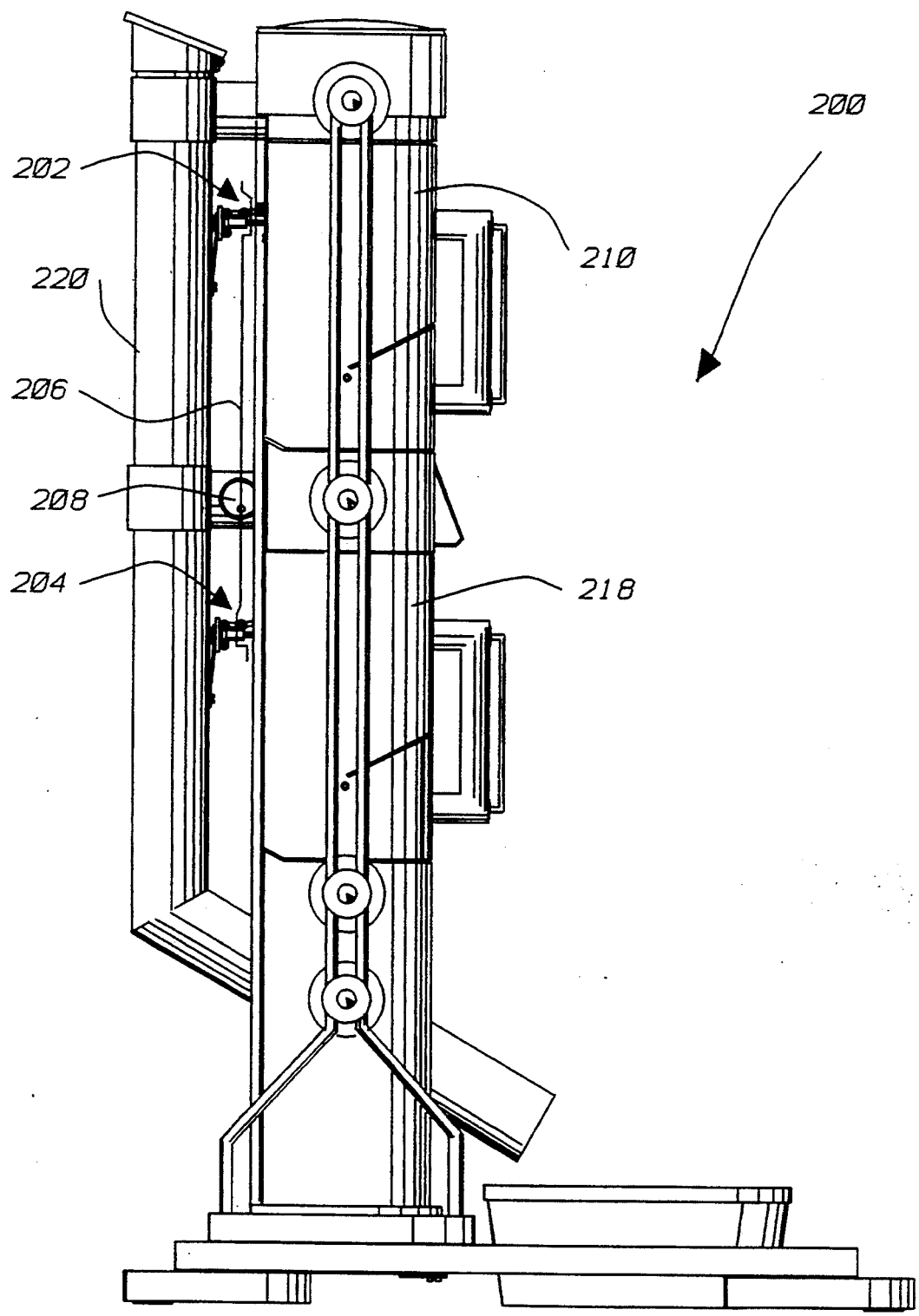
FIG. 15 is a side view of another embodiment of a modular animal feeding apparatus in accordance with the present invention.

FIG. 15 illustrates an alternative embodiment of a modular animal feeding apparatus 200 in accordance with the present invention. The apparatus 200 utilizes different types of releasable blocking assemblies 202 and 204 than the apparatus 20. The releasable blocking assemblies 202 and 204 are released my means of a rod 206 that is moved by a motor 208. The motor 208 is positioned between the chambers 210 and 218.

Figure 16:
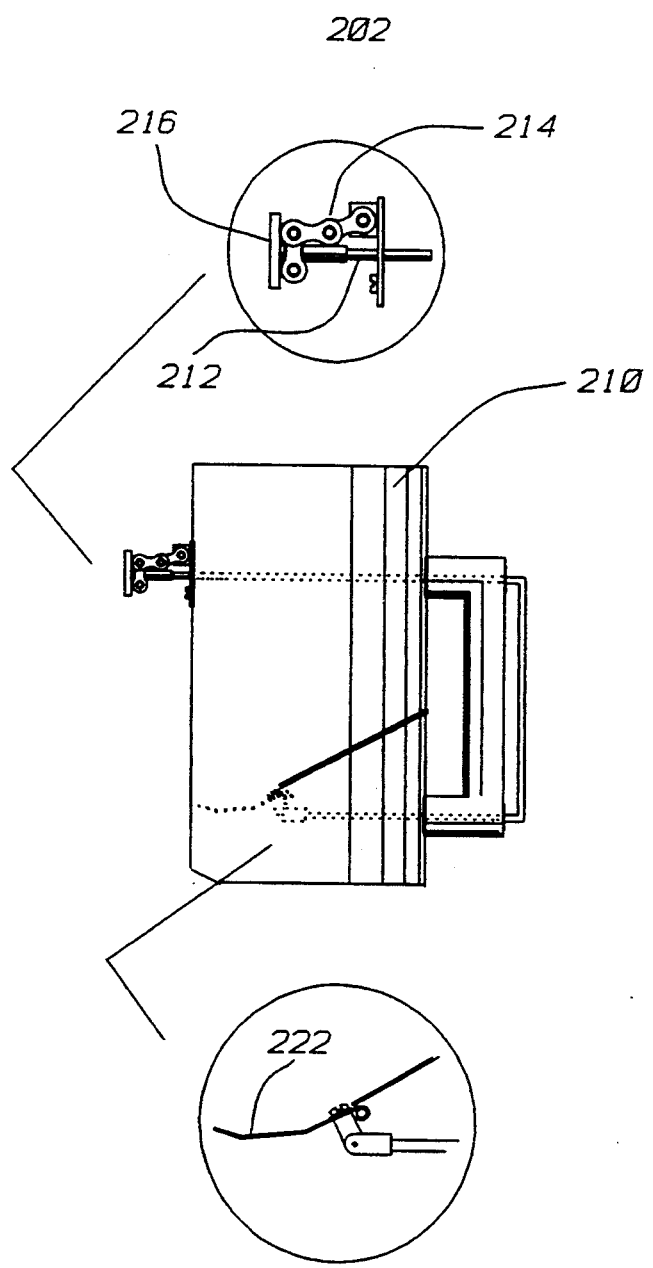
FIG. 16 is an enlarged side view of one of the chambers of the modular animal feeding apparatus shown in FIG. 15.

FIG. 16 illustrates the upper releasable blocking assembly 202. A chain link trip mechanism 214 is mounted to the trigger rod 212 on the outside of the chamber 210. The structure and operation of the chain link trip mechanism 214 is similar to the chain link trip mechanism 118 discussed above. A valve engagement member 216 is connected to the chain link trip mechanism 214 to release liquid contained in the upper and lower sections of the liquid tower 220. There is no chain link trip mechanism located beneath the flap 222.

Figure 17:
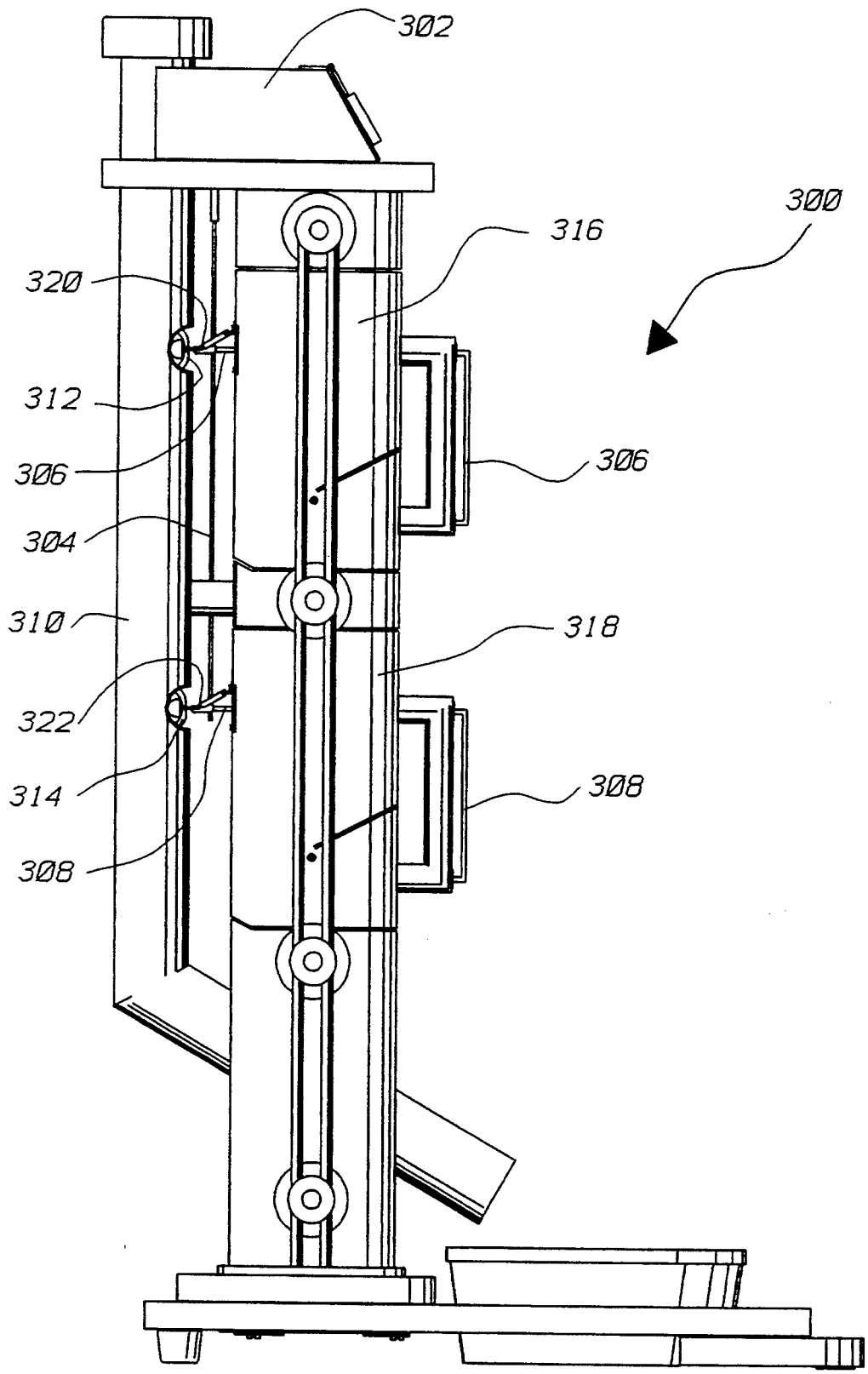
FIG. 17 is a side view of another embodiment of a modular animal feeding apparatus in accordance with the present invention.

FIG. 17 illustrates yet another embodiment of a modular animal feeding apparatus 300 in accordance with the present invention. The control system 302, whether it includes an alarm clock, photocell, timer, or other triggering device, is located at the top of the apparatus 300. A motor inside the control system 302 moves a rod 304 which engages with trigger rods 306 and 308. The trigger rods 306 and 308 release the releasable blocking assemblies contained in the chambers 316 and 318. The ends 320 and 322 of the trigger rods 306 and 308, respectively, are used to pinch liquid tubes 312 and 314 to stop the flow of liquid out of the upper and lower sections of the liquid tower 310.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. An animal feeding apparatus, comprising:
    at least two chambers that each have a hollow passage therethrough to which access is provided by two openings positioned at opposite ends of each chamber;
    support means for vertically supporting the chambers one above the other so that one of the chambers is in an upper position and the other chamber is in a lower position and so that either one of the chambers may be removed from the support means without removing the other chamber and for positioning the chambers so that the hollow passage of the upper chamber is substantially aligned with the hollow passage of the lower chamber and so that the chambers are vertically higher than a feeding area;
    releasable blocking means associated with each chamber for releasably blocking the hollow passage of each chamber for supporting food within the hollow passage of each chamber; and
    a control system for releasing each of the releasable blocking means so that food contained in the hollow passage of the lower chamber falls out of the lower chamber to the feeding area and so that food contained in the hollow passage of the upper chamber falls out of the upper chamber and through the hollow passage of the lower chamber to the feeding area.

2. An animal feeding apparatus according to claim 1, wherein each of the releasable blocking means comprises:
    a first flap member hingedly connected to each respective chamber inside the hollow passage to block at least a portion of the hollow passage when the first flap member is in a closed position and to move to an open position to unblock the hollow passage when the respective releasable blocking means is released.

3. An animal feeding apparatus according to claim 2, wherein each of the releasable blocking means further comprises:
    a second member fixedly secured in the hollow passage to block a portion of the hollow passage that is not blocked by the first flap member when the first flap member is in the closed position.

4. An animal feeding apparatus according to claim 1, further comprising:
    a first receptacle for containing a liquid and having an aperture in a lower portion thereof for releasing a liquid therefrom, the first receptacle being supported by the support means in a position that is vertically higher than the feeding area; and
    a first valve for opening the aperture in the first receptacle in response to one of the releasable blocking means being released.

5. An animal feeding apparatus, comprising:
    at least two chambers that each have a hollow passage therethourgh to which access is provided by two openings positioned at opposite ends of each chamber;
    support means for vertically supporting the chambers one above the other so that one of the chambers is in an upper position and the other chamber is in a lower position and for positioning the chambers so that the hollow passage of the upper chamber is substantially aligned with the hollow passage of the lower chamber and so that the chambers are vertically higher than a feeding area;
    releasable blocking means associated with each chamber for releasably blocking the hollow passage of each chamber for supporting food within the hollow passage of each chamber; and
    a control system for releasing each of the releasable blocking means so that food contained in the hollow passage of the lower chamber falls out of the lower chamber to the feeding area and so that food contained in the hollow passage of the upper chamber falls out of the upper chamber and through the hollow passage of the lower chamber to the feeding area;
    wherein the control system includes:
    an upper solenoid for releasing the releasable blocking means associated with the upper chamber; and
    a lower solenoid for releasing the releasable blocking means associated with the lower chamber.

6. An animal feeding apparatus according to claim 5, wherein the control system further comprises:
    an alarm clock for activating the upper and lower solenoids.

7. An animal feeding apparatus according to claim 5, wherein the control system further comprises:
    a photocell for activating the upper and lower solenoids.

8. An animal feeding apparatus, comprising:
    at least two chambers that each have a hollow passage therethrough to which access is provided by two openings positioned at opposite ends of each chamber;
    support means for vertically supporting the chambers one above the other so that one of the chambers is in an upper position and the other chamber is in a lower position and for positioning the chambers so that the hollow passage of the upper chamber is substantially aligned with the hollow passage of the lower chamber and so that the chambers are vertically higher than a feeding area;

releasable blocking means associated with each chamber for releasably blocking the hollow passage of each chamber for supporting food within the hollow passage of each chamber;

a control system for releasing each of the releasable blocking means so that food contained in the hollow passage of the lower chamber falls out of the lower chamber to the feeding area and so that food contained in the hollow passage of the upper chamber falls out of the upper chamber and through the hollow passage of the lower chamber to the feeding area;

a first receptacle for containing a liquid and having an aperture in a lower portion thereof for releasing a liquid therefrom, the first receptacle being supported by the support means in a position that is vertically higher than the feeding area;

a first valve for opening the aperture in the first receptacle in response to one of the releasable blocking means being released;

a second receptacle for containing a liquid and having an aperture in a lower portion thereof for releasing a liquid therefrom, the second receptacle being supported by the support means in a position that is vertically above the first receptacle so that liquid released from the aperture in the second receptacle flows into the first receptacle;

a second valve for opening the aperture in the second receptacle in response to the releasable blocking means associated with the upper chamber being released; and wherein, the first valve opens the aperture in the first receptacle in response to the releasable blocking means associated with the lower chamber being released.

9. An animal feeding apparatus, comprising:

at least two chambers that each have a hollow passage therethrough to which access is provided by two openings positioned at opposite ends of each chamber;

support means for vertically supporting the chambers one above the other so that one of the chambers is in an upper position and the other chamber is in a lower position and for positioning the chambers so that the hollow passage of the upper chamber is substantially aligned with the hollow passage of the lower chamber and so that the chambers are vertically higher than a feeding area;

releasable blocking means associated with each chamber for releasably blocking the hollow passage of each chamber for supporting food within the hollow passage of each chamber;

a control system for releasing each of the releasable blocking means so that food contained in the hollow passage of the lower chamber falls out of the lower chamber to the feeding area and so that food contained in the hollow passage of the upper chamber falls out of the upper chamber and through the hollow passage of the lower chamber to the feeding area;

a first receptacle for containing a liquid and having an aperture in a lower portion thereof for releasing a liquid therefrom, the first receptacle being supported by the support means in a position that is vertically higher than the feeding area; and a first valve for opening the aperture in the first receptacle in response to one of the releasable blocking means being released;

wherein the first valve includes:

a rubber tube connected to the aperture in the first receptacle;

a substantially squared-off U-shaped wire having its ends connected to the first receptacle next to the aperture in the first receptacle;

a length of cord having one end thereof secured to the U-shaped wire for pulling the U-shaped wire against the rubber tube to pinch the rubber tube to stop liquid from being released therefrom when tension is put on the cord; and a catch secured to the cord for engaging with the one of the releasable blocking means for maintaining tension on the cord and for releasing tension on the cord when the one of the releasable blocking means is released.

10. An animal feeding apparatus according to claim 9, wherein the one of the releasable blocking means comprises:

a trigger rod that is slidably mounted to the chamber to permit movement of the trigger rod back and forth along a longitudinal axis thereof so that a second end of the trigger rod extends out of the chamber to engage with the catch, a first end of the trigger rod being connected to the one of the releasable blocking means so that the trigger rod second end releases the catch when the one of the releasable blocking means is released.

11. An animal feeding apparatus, comprising:

a chamber having a hollow passage therethrough to which access is provided by two openings positioned at opposite ends of the chamber;

a receptacle for containing a liquid and having an aperture in a lower portion thereof for releasing a liquid therefrom;

support means for vertically supporting the chamber and the receptacle so that they are vertically higher than a feeding area;

releasable blocking means for releasably blocking the hollow passage of the chamber for supporting food within the hollow passage of the chamber;

a valve for opening the aperture in the receptacle, the valve being triggered to open the aperture in the receptacle by the releasable blocking means when the releasable blocking means is released; and a control system for releasing the releasable blocking means so that a serving of pet food in the hollow passage of the chamber falls out of the chamber to the feeding area and so that the releasable blocking means triggers the valve to open the aperture in the receptacle to release a liquid therefrom to the feeding area.

12. An animal feeding apparatus according to claim 11, wherein the releasable blocking means comprises:

a first flap member hingedly connected to the chamber inside the hollow passage to block at least a portion of the hollow passage when the first flap member is in a closed position and to move to an open position to unblock the hollow passage when the releasable blocking means is released.

13. An animal feeding apparatus according to claim 12, wherein the releasable blocking means further comprises:

a second member fixedly secured in the hollow passage to block a portion of the hollow passage that is not blocked by the first flap member when the first flap member is in the closed position.

14. An animal feeding apparatus according to claim 11, wherein the control system comprises:
a solenoid for releasing the releasable blocking means.

15. An animal feeding apparatus according to claim 14, wherein the control system further comprises:
an alarm clock for activating the solenoid.

16. An animal feeding apparatus according to claim 14, wherein the control system further comprises:
a photocell for activating the solenoid.

17. An animal feeding apparatuses, comprising:
a chamber having a hollow passage therethrough to which access is provided by two openings positioned at opposite ends of the chamber;
a receptacle for containing a liquid and having an aperture in a lower portion thereof for releasing a liquid therefrom;
support means for vertically supporting the chamber and the receptacle so that they are vertically higher than a feeding area;
releasable blocking means for releasably blocking the hollow passage of the chamber for supporting food within the hollow passages of the chamber;
a valve for opening the aperture in the receptacle, the valve being triggered to open the aperture in the receptacle by the releasable blocking means when the releasable blocking means is released; and
a control system for releasing the releasable blocking means so that a serving of pet food in the hollow passage of the chamber falls out of the chamber to the feeding area and so that the releasable blocking means triggers the valve to open the aperture in the receptacle to release a liquid therefrom to the feeding area;
wherein the releasable blocking means includes a first flap member hingedly connected to the chamber inside the hollow passage to block at least a portion of the hollow passage when the first flap member is in a closed position and to move to an open position to unblock the hollow passage when the releasable blocking means is released; and
wherein the releasable blocking means further includes a trigger rod having first and second ends and having a shape such that the first and second ends are substantially parallel to each other, the trigger rod being slidably mounted to the chamber so that the first and second ends of the trigger rod extend from outside of the chamber through a first side thereof into the hollow passage of the chamber to permit movement of the trigger rod back and forth along the longitudinal axes of the first and second ends, the trigger rod first end being connected inside the hollow passage to move with the first flap member and the trigger rod second end extending all the way across the hollow passage and through a second side of the chamber for triggering the valve, the second side of the chamber being opposite the first side of the chamber.

18. An animal feeding apparatus according to claim 17, wherein the valve comprises:
a rubber tube connected to the aperture in the receptacle;
a substantially squared-off U-shaped wire having its ends connected to the receptacle next to the aperture;
a length of cord having one end thereof secured to the U-shaped wire for pulling the U-shaped wire against the rubber tube to pinch the rubber tube to stop liquid from being released therefrom when tension is put on the cord; and
a catch secured to the cord for engaging with the second end of the trigger rod to maintain tension on the cord when the first flap member is in the closed position and for releasing tension on the cord when the first flap member is in the open position.

19. An animal feeding apparatus, comprising:
at least two chambers that each have a hollow passage therethrough to which access is provided by two openings positioned at opposite ends of each chamber;
first and second receptacles for containing liquid, each of the first and second receptacles having an aperture in a lower portion thereof for releasing liquid therefrom;
a support for vertically supporting the chambers one above the other so that one of the chambers is in an upper position and the other chamber is in a lower position and for positioning the chambers so that the hollow passage of the upper chamber is substantially aligned with the hollow passage of the lower chamber and so that the chambers are vertically higher than a feeding area, the support supporting the first receptacle in a position that is vertically higher than the feeding area and supporting the second receptacle in a position that is vertically above the first receptacle so that liquid released from the aperture in the second receptacle can flow into the first receptacle;
upper and lower releasable blocking assemblies associated with the upper and lower chambers, respectively, each releasable blocking assembly having a first flap member hingedly connected to the chamber inside the hollow passage to block at least a portion of the hollow passage for supporting food within the hollow passage when the first flap member is in a closed position and to move to an open position to unblock the hollow passage when the releasable blocking assembly is released;
first and second valves for opening the apertures in the first and second receptacles, respectively, the first valve being triggered to open the aperture in the first receptacle when the lower releasable blocking assembly is released and the second valve being triggered to open the aperture in the second receptacle when the upper releasable blocking assembly is released; and
a control system for releasing the upper and lower releasable blocking assemblies so that food contained in the hollow passage of the lower chamber falls out of the lower chamber to the feeding area and so that food contained in the hollow passage of the upper chamber falls out of the upper chamber and through the hollow passage of the lower chamber to the feeding area, the first valve being triggered to open the aperture in the first receptacle to release a liquid therefrom and the second valve being triggered to open the aperture in the second receptacle to release a liquid therefrom.

20. An animal feeding apparatus according to claim 19, wherein the first valve is triggered to open the aperture in the first receptacle by the lower releasable blocking assembly being released and the second valve is triggered to open the aperture in the second receptacle by the upper releasable blocking assembly being released.

21. An animal feeding apparatus according to claim 19, wherein the support has a food delivery tube for directing a liquid released from the first receptacle to the feeding area and for directing food released from the chambers to the feeding area.

22. An animal feeding apparatus according to claim 19, wherein the upper and lower releasable blocking assemblies each comprise:
a second member fixedly secured in the hollow passage to block a portion of the hollow passage that is not blocked by the first flap member when the first flap member is in the closed position.

23. An animal feeding apparatus according to claim 19, wherein the upper and lower releasable blocking assemblies each comprise:
a trigger rod having first and second ends and having a shape such that the first and second ends are substantially parallel to each other, the trigger rod being slidably mounted to the chamber so that the first and second ends of the trigger rod extend from outside of the chamber through a first side thereof into the hollow passage of the chamber to permit movement of the trigger rod back and forth along the longitudinal axes of the first and second ends, the trigger rod first end being connected inside the hollow passage to move with the first flap member and the trigger rod second end extending all the way across the hollow passage and through a second side of the chamber for triggering the respective valve, the second side of the chamber being opposite the first side of the chamber.

24. An animal feeding apparatus according to claim 23, wherein the first and second valves each comprise:
a rubber tube connected to the aperture in the respective receptacle; a substantially squared-off U-shaped wire having its ends connected to the respective receptacle next to the aperture;
a length of cord having one end thereof secured to the U-shaped wire for pulling the U-shaped wire against the rubber tube to pinch the rubber tube to stop liquid from being released therefrom when tension is put on the cord; and
a catch secured to the cord for engaging with the second end of the respective trigger rod to maintain tension on the cord when the first flap member is in the closed position and for releasing tension on the cord when the first flap member is in the open position.

25. An animal feeding apparatus according to claim 19, wherein the upper and lower releasable blocking assemblies each comprise:
a trigger lever having first and second ends, the trigger lever being pivotally connected at a point between its first and second ends to the chamber inside the hollow passage so that pressure on the first end causes the second end to move the first flap member to the open position.

26. An animal feeding apparatus according to claim 25, wherein the control system comprises:
an upper solenoid for applying pressure to the first end of the trigger lever of the upper releasable blocking assembly to move the first flap member of the upper releasable blocking assembly to the open position; and
a lower solenoid for applying pressure to the first end of the trigger lever of the lower releasable blocking assembly to move the first flap member of the lower releasable blocking assembly to the open position.

27. An animal feeding apparatus according to claim 26, wherein the control system further comprises:
an alarm clock for activating the upper and lower solenoids.

28. An animal feeding apparatus according to claim 26, wherein the control system further comprises:
a photocell for activating the upper and lower solenoids.

* * * * *